(12) United States Patent
Flamm et al.

(10) Patent No.: US 12,706,433 B2
(45) Date of Patent: Aug. 11, 2026

(54) DEVICE, LASER SYSTEM AND METHOD FOR COMBINING COHERENT LASER BEAMS

(71) Applicant: TRUMPF Laser GmbH, Schramberg (DE)

(72) Inventors: Daniel Flamm, Ludwigsburg (DE); Andreas Heimes, Renningen (DE); Maike Prossotowicz, Aichhalden (DE)

(73) Assignee: TRUMPF LASER GMBH, Schramberg (DE)

( * ) Notice: Subject to any disclaimer, the term of this patent is extended or adjusted under 35 U.S.C. 154(b) by 794 days.

(21) Appl. No.: 17/874,315

(22) Filed: Jul. 27, 2022

(65) Prior Publication Data

US 2022/0376461 A1 Nov. 24, 2022

Related U.S. Application Data

(63) Continuation of application No. PCT/EP2021/051467, filed on Jan. 22, 2021.

(30) Foreign Application Priority Data

Jan. 31, 2020 (DE) ..................... 10 2020 201 161.3

(51) Int. Cl.
*H01S 3/23* (2006.01)
*G02B 3/00* (2006.01)
(Continued)

(52) U.S. Cl.
CPC .......... *H01S 3/2383* (2013.01); *G02B 3/0037* (2013.01); *G02B 27/106* (2013.01);
(Continued)

(58) Field of Classification Search
None
See application file for complete search history.

(56) References Cited

U.S. PATENT DOCUMENTS 5,600,666 A * 2/1997 Hiiro ..................... G02B 3/005 372/100
9,620,928 B2 4/2017 Chann et al.
(Continued)

FOREIGN PATENT DOCUMENTS

CN 201307197 Y 9/2009
CN 101592785 A 12/2009
(Continued)

OTHER PUBLICATIONS

M. Antier et al, "Highly scalable coherent fiber combining using interferometric technique," in CLEO: 2013, OSA Technical Digest (online), Jun. 2013, pp. 1-2,Optica Publishing Group, San Jose, California, United States.
(Continued)

*Primary Examiner* — Shan Liu
(74) *Attorney, Agent, or Firm* — LEYDIG, VOIT & MAYER, LTD.

(57) ABSTRACT

An apparatus for combining a plurality of coherent laser beams includes a splitting device for splitting an input laser beam into the plurality of coherent laser beams, a plurality of phase setting devices for adjusting a respective phase of one of the coherent laser beams, and a beam combining device for combining the coherent laser beams, which emanate from a plurality of grid positions of a grid arrangement, to form at least one combined laser beam. The beam combining device has a microlens arrangement with exactly one microlens array for forming the at least one combined laser beam.

22 Claims, 5 Drawing Sheets

(51) Int. Cl.

| | |
|---|---|
| ***G02B 27/10*** | (2006.01) |
| ***H01S 3/10*** | (2006.01) |
| ***H01S 3/13*** | (2006.01) |

(52) U.S. Cl.

CPC ...... *G02B 27/1086* (2013.01); *H01S 3/10053* (2013.01); *H01S 3/1307* (2013.01)

(56) References Cited

U.S. PATENT DOCUMENTS

| | | | |
|---|---|---|---|
| 9,735,537 | B1 | 8/2017 | Rothenberg et al. |
| 10,250,013 | B2 | 4/2019 | Shekel |
| 2002/0048292 | A1 | 4/2002 | Bissinger et al. |
| 2006/0239312 | A1 | 10/2006 | Kewitsch et al. |
| 2012/0127723 | A1 | 5/2012 | Mikhailov et al. |
| 2012/0236212 | A1* | 9/2012 | Itoh ...................... G03B 21/208 348/744 |
| 2013/0107343 | A1 | 5/2013 | Shekel |
| 2014/0139903 | A1 | 5/2014 | Goodno et al. |
| 2017/0123218 | A1 | 5/2017 | Stigwall et al. |

FOREIGN PATENT DOCUMENTS

| | | | | |
|---|---|---|---|---|
| CN | 103513428 | A | 1/2014 | |
| CN | 107044847 | A | 8/2017 | |
| CN | 115039017 | A | 9/2022 | |
| DE | 10243367 | B4 | 11/2006 | |
| DE | 102009021251 | A1 | 11/2010 | |
| DE | 19948353 | B4 | 8/2012 | |
| WO | WO-2020016336 | A1 * | 1/2020 | ......... G02B 27/1006 |

OTHER PUBLICATIONS

Zimmermann, et al., „Refractive Micro-Optics for Multi-Spot and Multi-Line Generation, *Proceedings of LPM 2008*, pp. 1-5, Jun. 20, 2008, Japan Laser Processing Society, Osaka, Japan.

Streibl, et al., „Array Generation with Lenslet Arrays, *Applied Optics* 30, 19, p. 2739-2742, Jul. 1, 1991, Optica Publishing Group, Washington D.C., USA.

Wippermann, et al. ,"Beam Homogenizers Based on Chirped Microlens Arrays," *Optics Express* 15, 10, pp. 6218-6231, May 4, 2007, Optica Publishing Group, Washington D.C., USA.

* cited by examiner

16'
12
21
20
19
18
17
16
11
10
3.1
3.2
3.3
3.4
3.5
8.1
8.2
8.3
8.4
8.5
FFx
X
Z

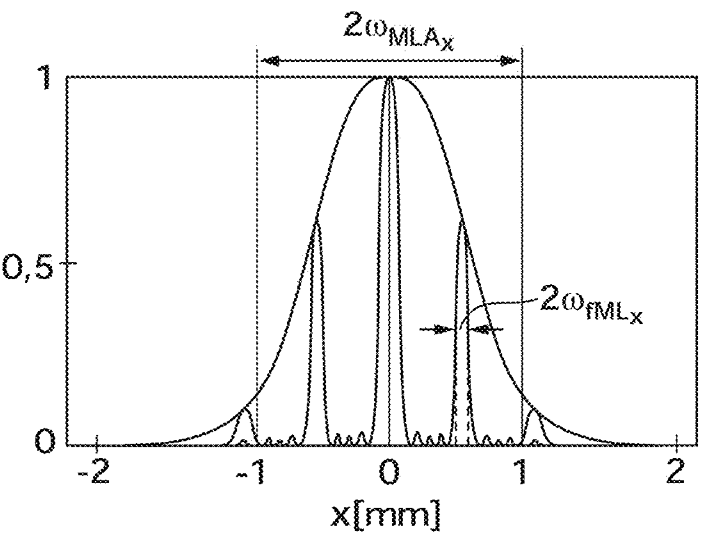
Fig. 3
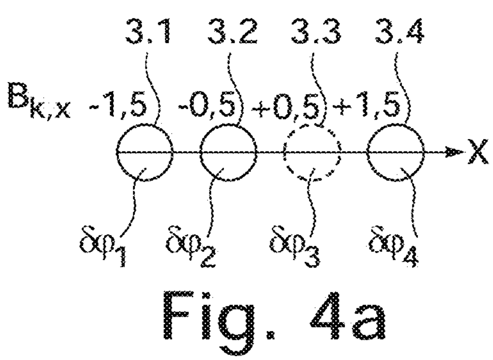
Fig. 4a
Fig. 4b
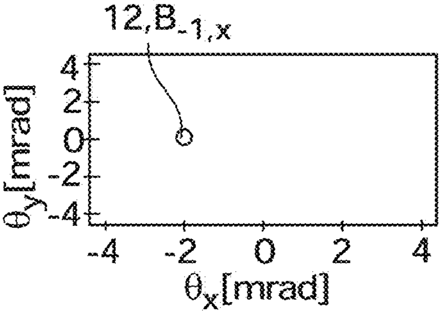
Fig. 5a
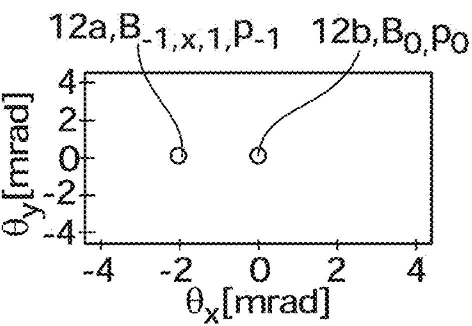
Fig. 5b

DEVICE, LASER SYSTEM AND METHOD FOR COMBINING COHERENT LASER BEAMS

CROSS REFERENCE TO RELATED APPLICATIONS

This application is a continuation of International Application No. PCT/EP2021/051467 (WO 2021/151795 A1), filed on Jan. 22, 2021, and claims benefit to German Patent Application No. DE 10 2020 201 161.3, filed on Jan. 31, 2020. The aforementioned applications are hereby incorporated by reference herein.

FIELD

The invention relates to an apparatus for combining a plurality of coherent laser beams, comprising: a splitting device for splitting an input laser beam into the plurality of coherent laser beams, a plurality of phase setting devices for adjusting a respective phase of one of the coherent laser beams, and a beam combining device for combining the coherent laser beams, which emanate from a plurality of grid positions of a grid arrangement, to form at least one combined laser beam. The invention also relates to a method for combining a plurality of coherent laser beams, in particular by means of such an apparatus.

BACKGROUND

Within the meaning of this application, “coherent laser beams” is to be understood in the context of a temporal coherence of the laser beams. In general, the laser beams may have a reduced degree of spatial coherence, that is to say the laser beams can be spatially partially coherent, that is to say this does not necessarily relate to single mode laser beams. By way of example, the laser beams can be produced by multi-mode sources and can for example form a higher-mode Gaussian mode, e.g., a Laguerre-Gaussian mode, a Hermite-Gaussian mode or superpositions thereof. However, the laser beams are preferably coherent both in time and space.

In the case of a coherent beam combination, a plurality of laser beams which emanate from a plurality of grid positions of a grid arrangement are superposed to form a combined laser beam, which has a correspondingly higher power. Such a beam combination can be implemented—virtually without loss of beam quality—diffractively, reflectively, for example by way of a segmented mirror, interferometrically or by way of polarization coupling.

US 2013 010 7343 A1 has described a laser system which comprises a laser source in the form of a seed laser and an optical gain system which produces an amplified laser output. The laser system may contain a phase control circuit having a phase modulation functionality for a plurality of optical amplifiers, which comprises a sensor for measuring the overall output intensity of the optical amplifiers. The phase control circuit can change a phase or relative phase relationship between individual optical amplifiers from the total thereof in order to maximize the overall output intensity of the optical amplifiers. The laser system can contain a coherent far-field combination means for combining the output of the optical amplifiers, which comprises a pair of microlens arrays.

US 2013 010 7343 A1 consequently has disclosed the practice of using a (micro)lens arrangement with a pair of microlens arrays as a beam combining device for the coherent combination of a plurality of coherent laser beams to form a combined laser beam. A beam combining device for forming at least one combined laser beam is also described in DE 10 2018 211 971 A1 and WO 2020/016336 A1, said beam combining device having a microlens arrangement with at least two microlens arrays. The beam combination using the at least two microlens arrays is based on the principle of an imaging (two-stage) homogenizer. How such a microlens arrangement should be optimized in view of its parameters (pitch of the microlenses, focal length of the microlenses or the microlens arrangement, spacing of the microlens arrays, . . . ) in order to produce a combined laser beam with an optimized, high beam quality (>90% combining efficiency) is also specified there. When the beam path is reversed, this principle facilitates a homogeneous distribution of the generated intensity peaks, and hence a high beam splitting efficiency.

Very different laser application processes, e.g., additive manufacturing, marking, and welding (both micro-welding and macro-welding) or laser switching processes in laser networks, require a fast deflection of a focal position of a laser beam (scanning) and/or the spilt of a laser beam for the alignment with a plurality of focal positions (beam splitting). Some laser material processing processes, e.g. the separation of transparent materials, possibly require high mean laser powers (of the order of kW) and high pulse energies (of the order of mJ).

SUMMARY

In an embodiment, the present disclosure provides an apparatus for combining a plurality of coherent laser beams includes a splitting device for splitting an input laser beam into the plurality of coherent laser beams, a plurality of phase setting devices for adjusting a respective phase of one of the coherent laser beams, and a beam combining device for combining the coherent laser beams, which emanate from a plurality of grid positions of a grid arrangement, to form at least one combined laser beam. The beam combining device has a microlens arrangement with exactly one microlens array for forming the at least one combined laser beam.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 3 shows a representation of the intensities of the coherent laser beams and of the combined laser beam in the beam combining device of FIG. 2*b;*

FIGS. 4*a* and 4*b* show representations of a one-dimensional arrangement of four or five coherent laser beams with a respective assigned fundamental phase or additional phase for producing a single diffracted laser beam;

FIGS. 5*a* and 5*b* show representations of the far field of the beam combining device when using the phases shown in FIG. 4*b* or when using phases in which the combined laser beam is diffracted into two different orders of diffraction;

DETAILED DESCRIPTION

Figure 1A:
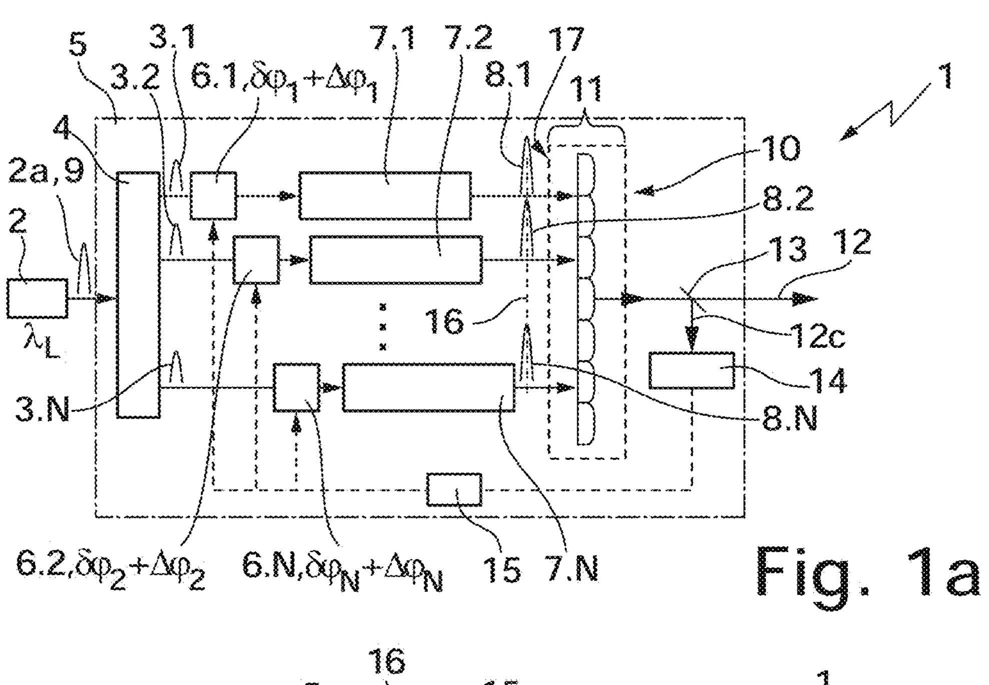
FIG. 1*a* shows a schematic representation of a laser system having an apparatus for combining a plurality of coherent laser beams, which are amplified in a plurality of gain fibers.

The invention is based on the object of providing an apparatus, a laser system, and an associated method for combining coherent laser beams, which even in the case of high laser powers allow virtually complete maintenance of the beam quality during the combination and which additionally allow a fast deflection of a combined laser beam and/or a splitting of the beam of a combined laser beam with a specified division of the input power to be carried out.

According to the invention, this object is achieved by an apparatus of the type set forth at the outset, in which the beam combining device has a microlens arrangement with exactly one microlens array.

The inventors have recognized that when the coherent laser beams are combined in an imaging homogenizer having (at least) two microlens arrays, (at least) one microlens array is situated in the focus or the focal plane of another microlens array. This may lead to burned areas in the microlens array, leading to a loss of power and making material processing at high mean laser powers and mean pulse energies more difficult. In the worst-case scenario, the microlens array situated in the focal plane of the other microlens array can be destroyed.

The present application therefore proposes the use of only a single microlens array for the purposes of combining the coherent laser beams, said microlens array being used with defined parameters (pitch of the microlenses, focal length of the microlenses, . . . ) for combining the coherent laser beams. The principle of the non-imaging, single-stage homogenizer is implemented using such a beam combining device, that is to say only a single microlens array is still used for combination purposes. This reduces the homogeneity, and so beam splitting with a sufficient homogeneity can no longer occur.

The inventors have recognized that although a sufficient beam splitting efficiency cannot be obtained during beam splitting, suitably chosen parameters facilitate a beam combination with a sufficiently high combination efficiency of, e.g., more than approximately 65% (in the case of three coherent laser beams), more than approximately 85% (in the case of five coherent laser beams) or higher even when a single-stage homogenizer is used. This is possible, inter alia, because the intensity of the coherent laser beams can be suitably chosen (e.g., homogeneously) at the grid positions. If moreover the number of coherent laser beams is increased, for example to a number greater than 10, it is even possible to achieve a combination efficiency of more than 90%.

Within the meaning of this application, a microlens arrangement with exactly one microlens array is understood to mean that only the microlenses of a single microlens array bring about the beam combination in a respective direction in which the beam combination is implemented (e.g., in the X-direction or in the Y-direction). In the case where there is a beam combination in two directions (e.g., in the X-direction and in the Y-direction), the exactly one microlens array can have two crossed cylindrical lens arrays within the meaning of this definition, with the microlenses of a respective cylindrical lens array acting only in one direction (X-direction or Y-direction). In this case, the two cylindrical lens arrays are typically arranged immediately adjacently, that is to say these are located (approximately) in a common plane. For the two-dimensional beam combination, two crossed cylindrical lens arrays can be replaced by a single microlens array which has square or rectangular microlenses, for example.

The conditions described in DE 10 2018 211 971 A1 or in WO 2020/016336 A1 for the optimal parameters of such a microlens arrangement also apply accordingly to the single-stage homogenizer described here. However, the (effective) focal length of the microlens arrangement with the at least two microlens arrays is replaced by the focal length of the exactly one microlens array. DE 10 2018 211 971 A1 and WO 2020/016336 A1 are in the totality thereof incorporated in the content of this application by reference.

The splitting device for splitting the input laser beam can for example be a conventional 1-to-N coupling device, for example in the form of one or more microlens arrays, a fiber splitter, a plurality of series-connected beam splitter cubes, polarization beam splitters, a diffraction grating for splitting the beam, etc. The input laser beam can be a seed laser beam produced by a laser source or the input laser beam can be produced from a seed laser beam of a laser source, for example by way of a split and coherent combination.

Alternatively, a plurality of laser sources, for example in the form of fiber oscillators, laser diodes, etc., may also serve to produce the plurality of coherent laser beams such that a splitting device can be dispensed with. In this case, a laser system containing the at least one laser source comprises a control device for driving the laser diodes or the laser sources in order to produce the coherent laser beams. The laser source(s) can be designed to produce ultrashort pulse laser beams, that is to say coherent laser beams which have a pulse duration of less than $10^{-12}$ s, for example.

In principle, the grid positions of the grid arrangement can be formed along a straight line or curve (one-dimensional grid arrangement) or along a plane or curved surface (two-dimensional grid arrangement). Along the grid arrangement, the coherent laser beams are separated or spaced apart from one another to such an extent that the desired fill factor is obtained. The grid positions of the grid arrangement can be formed at the end faces of fibers (emission areas) or of other emitters, from where a respective coherent laser beam is emitted. In this case, the fibers, more precisely their end faces, are arranged in a grid arrangement and the grid positions correspond to the emission areas on the end faces of the fibers. However, the grid positions or the grid arrangement may also correspond to the near field or the far field of the emission areas, that is to say the grid positions can be arranged along a curve or an area in space on which the emission surfaces are imaged or focused such that the spatial distribution of the grid positions corresponds to the—optionally scaled—spatial distribution of the emission areas.

Consequently, the grid arrangement forms a curve or an area in space, along which there is a desired distance between the grid positions or between the coherent laser beams. By way of example, if a Fourier lens is used to input couple the coherent laser beams (see below), the desired distance is present in the focal plane of the Fourier lens.

In an embodiment the coherent laser beams emanate from a plurality of grid positions arranged in a first direction, with the coherent laser beams and the microlens array satisfying the following condition:

$$N=p_x^2/(\lambda_L f_{ML}), \quad (1)$$

where N denotes a number of the grid positions arranged in the first direction X, $p_x$ denotes a pitch of the microlenses of the microlens array in the first direction, $\lambda_L$ denotes the laser wavelength, and $f_{ML}$ denotes the focal length of the microlens array.

In the case where the grid positions in the grid arrangement are additionally arranged in a second direction that is preferably perpendicular to the first, the coherent laser beams and the microlens arrangement typically additionally satisfy the following condition:

$$M=p_Y^2/(\lambda_L f_{ML}), \quad (2)$$

where M denotes a number of the grid positions arranged in the second direction and $p_Y$ denotes a pitch of the microlenses of a respective microlens array in the second direction.

The inventors have recognized that the beam quality of an individual coherent laser beam is virtually fully maintained, even in the case of a single-stage homogenizer, during the combination to form the combined laser beam if equations (1) and/or (2) above are satisfied.

It is understood that equation (1) cannot be exactly observed in practice. The beam quality of the superposed laser beam deteriorates in the case where there is a deviation from equation (1). Within the context of this application, equation (1) above is considered satisfied if the right-hand side of equation (1) deviates by no more than 20%, preferably by no more than 10%, in particular by no more than 5% from the (integer) value N on the left-hand side of equation (1), that is to say if the following applies: $|N-p_x^2/(\lambda_L f_{ML})|\leq 0.2$, preferably <0.1, in particular <0.05. A corresponding statement also applies to the equation (2), i.e., $|M-p_Y^2/(\lambda_L f_E)|<0.2$, preferably <0.1, in particular <0.05.

In a further embodiment, the apparatus is designed to input couple coherent laser beams that are adjacent in the first direction into the microlens arrangement with a specified angle difference $\delta\theta_x$, for which the following applies:

$$\delta\theta_x=\lambda_L/p_x,$$

where $\lambda_L$ denotes the laser wavelength and $p_x$ denotes a pitch of the microlenses of the microlens array in the first direction.

To combine the coherent laser beams to form a combined laser beam, it is typically necessary or advantageous for adjacent coherent laser beams to be input coupled into the microlens arrangement with the angle difference $\delta\theta_x$ specified further above. In order to satisfy this condition, the grid positions from where the coherent laser beams emanate can be aligned at the respective angle difference $\delta\theta_x$ with respect to one another and, for example, can be arranged equidistantly on a circular arc. In this case, focusing of the coherent laser beams can be implemented for example with the aid of single lenses or using a further microlens array, which are/is arranged in the respective beam path of one of the coherent laser beams, but the provision of such lenses can optionally also be dispensed with. A corresponding condition applies to the angle difference between adjacent coherent laser beams in the second direction Y, that is to say the following applies: $\delta\theta_y=\lambda_L/p_y$. The aforementioned condition is considered satisfied if the following applies: $|\delta\theta_x-\lambda_L/p_x|<0.2$, preferably <0.1, in particular <0.05, or if the following applies: $|\delta\theta_y-\lambda_L/p_y|<0.2$, preferably <0.1, in particular <0.05.

In a further embodiment the apparatus comprises an input coupling optical unit for input coupling the coherent laser beams into the microlens arrangement, the input coupling optical unit comprising at least one focusing device, in particular at least one focusing lens, for focusing the plurality of coherent laser beams onto the microlens arrangement. In this case, use is made of an input coupling optical unit which is arranged between the grid positions from which the coherent laser beams emanate and the microlens arrangement. In the case where the beam paths of the coherent laser beams are too long to satisfy the conditions specified above, the input coupling optical unit may comprise a telescopic optical unit, for example in the form of at least two lenses.

The input coupling optical unit is not mandatory but may be advantageous, for example when setting up the laser system or the apparatus. In particular, the input coupling optical unit can be used to satisfy the aforementioned condition in relation to the angle difference $\delta\theta_x$ or $\delta\theta_y$ without for this purpose the beam emergence directions of the coherent laser beams at the grid positions having to be aligned at an angle with respect to one another. The use of a focusing lens which is arranged substantially at a distance of its focal length from the microlens arrangement (Fourier lens) was found to be advantageous to this end. In this case, the coherent laser beams can strike the focusing lens with substantially parallel alignment to one another and are focused on the microlens arrangement, more precisely on the microlens array. The focus or the beam diameter of the coherent laser beams incident on the one microlens array is substantially larger than the partial foci that would be incident on the first microlens array when two microlens arrays are used. Moreover, the beam diameter of the combined laser beam formed at the one microlens array is adjustable by way of the fill factor of the coherent laser beams at the grid positions and by way of the pitch of the microlenses of the microlens array.

By way of example, the grid positions can be arranged on a line in this case, that is to say the beam emergence directions or the Poynting vectors of the coherent laser beams are aligned parallel to one another. The use or the design of the input coupling optical unit and the arrangement of the grid positions depend on the boundary conditions, for example on the utilized laser source. By way of example, the use of an input coupling optical unit lends itself to the case where the grid positions form the end faces of fibers running in parallel.

In a development the coherent laser beams emanate from a plurality of grid positions which are arranged in a first direction and which have a distance $\delta_x$ from one another which is given by:

$$\delta_X=\lambda_L f_{FLin}/p_x,$$

where $\lambda_L$ denotes the laser wavelength, $f_{FLin}$ denotes the focal length of the focusing device, and $p_x$ denotes a pitch of the microlenses of the microlens array in the first direction. In the case where the grid positions are additionally arranged in a second direction (e.g., Y direction), the following applies accordingly to the distances δy in the second direction Y: $\delta y=f_{FLin}/p_y$, where $p_y$ denotes the pitch of the microlens array in the second direction Y.

In the case where the laser beams run in parallel, the grid positions are typically arranged in a common direction or line (e.g., in the X-direction) and optionally additionally in a common line in the Y-direction, which run(s) perpendicular to the common direction of the beam propagation of the laser beams. In this case, the distance δx between the laser beams or grid positions is typically defined by the aforementioned condition. The aforementioned condition is considered satisfied if the following applies: $|\delta x-\lambda_L f_{FLin}/p_x|<0.2$, preferably <0.1, in particular <0.05 and/or $|\delta y-\lambda_L f_{FLin}/p_y|<0.2$, preferably <0.1, in particular <0.05.

In an alternative embodiment the coherent laser beams emanate from a plurality of grid positions arranged in a first direction, the grid positions being arranged at a distance from the focal length $f_{ML}$ of the microlens array in front of the microlens array and the grid positions having a distance δx from one another, which is given by $$\delta x=p_x,$$

where $p_x$ denotes a pitch of the microlenses of the microlens array in the first direction. In the case where the coherent laser beams are additionally also arranged in a second direction, which is preferably perpendicular to the first direction, the following applies accordingly to the distances δy in the second direction: $\delta y=p_y$, where $p_y$ denotes the pitch of the microlenses of the microlens array in the second direction. The aforementioned condition is considered satisfied if the following applies: $|\delta x-p_x|<0.2$, preferably <0.1, in particular <0.05 and $|\delta y-p_y|<0.2$, preferably <0.1, in particular <0.05.

In the embodiment described here, the grid positions are arranged in the focal plane of the microlens array in the beam path of the coherent laser beams upstream of the microlens array. The inventors have recognized that the microlens array acts as a diffraction grating and that, in the case of near field diffraction, the brightness distribution of the microlens array repeats at certain Talbot distances, where the brightness distribution exactly corresponds to the structure of the diffraction grating itself. This is the case for the microlens array in the object-side focal plane. Therefore, the distance between the grid positions in the focal plane should correspond to the pitch of the microlenses of the microlens array.

In principle, the condition specified further above in relation to the angle $\delta\theta_x$, $\delta\theta_y$ between adjacent coherent laser beams should also be observed in this embodiment. However, the resultant angles $\delta\theta_x$, $\delta\theta_y$ are negligibly small in the present embodiment since the focal length is comparatively short. Although the focal length of the microlens array depends on the pitch of the microlenses and increases with increasing pitch, the pitch itself depends on the angle $\delta\theta_x$, $\delta\theta_y$ by way of the relationship $\delta\theta_x=\lambda_L/p_x$ or $\delta\theta_y=\lambda_L/p_y$ specified above. The angle $\delta\theta_x$, $\delta\theta_y$ therefore decreases with increasing pitch and also remains negligible in the case of a large pitch or relatively long focal lengths. Therefore, the coherent laser beams can typically be radiated onto the microlens array with parallel alignment without the use of an input coupling optical unit in this embodiment. The typical order of magnitude of the focal length $f_{ML}$ of the microlens array is less than approximately 70-80 mm and is shorter than the Rayleigh length of the coherent laser beams at the typically utilized wavelengths.

In a development the coherent laser beams have at the grid positions a beam diameter 2 $\omega_{fMLx}$ in the first direction, which is given by:

$$2\ \omega_{fMLx}=\lambda_L f_{ML}/p_x,$$

where denotes the laser wavelength. What applies as a matter of principle is that the plurality of coherent laser beams at the grid positions should reproduce the diffraction pattern as accurately as possible in the focal plane, said diffraction pattern arising in the case of a reversal of the beam direction, that is to say for the case where the microlens array is passed in the reverse direction. This can be achieved, inter alia, by virtue of the fact that the coherent laser beams satisfy the condition in relation to the beam diameter 2 $\omega_{fmLx}$ specified above. In this case, the beam diameter 2 $\omega_{fmLx}$ denotes the distance between two points in the intensity or power distribution (generally: a Gaussian distribution) in the first direction, where the maximum intensity or the peak power has dropped to 50%, that is to say the beam diameter 2 $\omega_{fMLx}$ denotes the full width at half maximum.

In the case where the grid positions are additionally also arranged in the second direction, the following applies accordingly to the beam diameter in the second direction: 2 $\omega_{fMLy}=\lambda_L f_{ML}/p_y$. As a rule, a respective coherent laser beam has a rotationally symmetric beam profile. In this case, the following applies: 2 $\omega_{fMLy}$=2 $\omega_{fMLx}$ and hence $p_y=p_x$. The aforementioned condition is considered satisfied if the following applies: $|2\ \omega_{fMLx}-\lambda_L f_{ML}/p_x|<0.2$, preferably <0.1, in particular <0.05 and/or $|2\ \omega_{fMLy}-\lambda_L f_{ML}/p_y|<0.2$, preferably <0.1, in particular <0.05.

In the case where the grid positions correspond to the end faces of optical fibers, the beam diameter at the respective grid position is substantially defined by the diameter of the optical fiber, more precisely the diameter of the beam emergence area on the end face of the optical fiber. It is possible with the aid of a suitable beam shaping device to change the beam diameter of the coherent laser beams following the emergence from the respective optical fiber such that a desired diameter is set at the respective grid position of the grid arrangement. By way of example, the beam shaping device may for this purpose comprise a plurality of (spherical) collimation or focusing lenses, in the focal plane of which the grid arrangement is formed.

It was found that the intensity of the coherent laser beams at the respective grid position has a comparatively small influence on the combination efficiency. The maximum intensities of the coherent laser beams may be equal in size in the present embodiment, as is also the case in the embodiment described further above. However, the coherent laser beams preferably have a respective maximum intensity at the grid positions, the envelope of which corresponds to an intensity distribution of the combined laser beam at the microlens array. The intensity distribution of the combined laser beam at the microlens array typically is a Gaussian distribution, which forms the envelope of the maximum intensities.

In a development, the coherent laser beams have a fill factor $FF_x$ in the first direction, for which the following applies: $FF_x<0.4$, preferably $FF_x<0.3$. Accordingly, it is advantageous if the following applies to the fill factor $FF_y$ in the second direction Y: $FF_y<0.4$, preferably $FF_y<0.3$.

The fill factor $FF_x$ in the first direction X is defined as $FF_x=2\ \omega_{fMLx}/\delta x$. Accordingly, the fill factor $FF_y$ in the second direction Y is defined as $FF_y=2\ \omega_{fMLy}/\delta y$. The distance $\delta x$ and $\delta y$ between the grid positions in the X-direction and Y-direction, respectively, denotes the distance between the centers of the beam profiles of adjacent coherent laser beams. It was found that the fill factor $FF_x$ or $FF_y$ should not be chosen to be too large in the present embodiment since the fill factor $FF_x$, $FF_y$ influences the beam diameter $2\ \omega_{MLAx}$ and $2\ \omega_{MLAy}$, respectively of the combined laser beam, as will be described below.

The following applies to the beam diameter $2\ \omega_{MLAx}$ of the intensity distribution of the combined laser beam at the microlens array in the first direction X:

$$2\omega_{MLAx}=4p_x/(\pi FF_x).$$

Unlike the beam diameter $2\ \omega_{fMLx}$ of the coherent laser beams, the beam diameter $2\ \omega_{MLAx}$ denotes the $1/e^2$ width, that is to say the distance between two points where the peak power has dropped to $1/e^2$ of the maximum, that is to say approximately 13.5% of the peak power. Accordingly, the following applies to the beam diameter $2\ \omega_{MLAy}$ of the combined laser beam at the microlens array in the second direction Y: $2\ \omega_{MLAy}=4\ p_y/(\pi FF_y)$. The above condition is considered satisfied if the following applies: $|2\ \omega_{MLAx}-4\ p_x/(\pi FF_x)|<0.2$, preferably $<0.1$, in particular $<0.05$ and $|2\ \omega_{MLAx}-4\ p_x/(\pi FF_x)|<0.2$, preferably $<0.1$, in particular $<0.05$.

As emerges from the relationship above, the diameter $2\ \omega_{MLAx}$ of the combined laser beam 12 and hence the illumination of the microlens array 17 reduces with increasing fill factor $FF_x$ in the first direction X. The higher the fill factor $FF_x$, the lower the combination efficiency. In principle, what applies is that the fill factor $FF_x$, $FF_y$ should be smaller, the greater the number of coherent laser beams in the respective direction.

In a further embodiment, the apparatus comprises a control device designed or programmed to adjust a respective phase of one of the coherent laser beams on the basis of an arrangement of the respective grid position within the grid arrangement in order to combine the coherent laser beams to form at least one laser beam that is diffracted into at least one order of diffraction. The order of diffraction can be the zeroth order of diffraction or an order of diffraction that differs from the zeroth order of diffraction.

The phases can be chosen in such a way that there is a combination into the zeroth order of diffraction that is optimized in view of the beam quality. The phases of, or phase differences between, the coherent laser beams may also be chosen such that the combined laser beam is diffracted into at least one higher order of diffraction in order to carry out a controlled beam deflection or a controlled beam split. In the case where an even number of coherent laser beams are combined there is no zeroth order of diffraction, that is to say the combined laser beam is always diffracted into at least one (half integer) order of diffraction in this case.

The phase of a respective coherent laser beam can be adjusted individually with the aid of the control device on the basis of the arrangement of the grid position of the grid arrangement assigned to the respective coherent laser beam so that the coherent laser beams are no longer combined to form a single or individual laser beam but are combined into two or more well-defined bundles or into two or more combined laser beams, which are diffracted with a defined power distribution or power division into different orders of diffraction (beam splitting) or into a single laser beam which is diffracted into an order of diffraction that differs from the zeroth order of diffraction (beam deflection).

The proposed approach is based on the concept of the optical phase array (OPA), in the case of which a set of absolute phases of the one-dimensional or two-dimensional grid arrangement of the coherent laser beams is chosen such that there is constructive interference at well-defined orders of diffraction. In the case of a one-dimensional or two-dimensional grid arrangement (array), the phases of the coherent laser beams to be combined can be chosen such that it is possible to add or remove individual combined laser beams, groups of combined laser beams or an entire array of combined laser beams, which corresponds to a set of orders of diffraction, in a targeted manner. For a respectively desired group of combined laser beams intended to be produced by the apparatus, it is possible for example to choose a suitable set of (absolute) phases by means of an iterative optimization algorithm in order to activate or deactivate the diffraction to certain orders of diffraction in a targeted manner. In this way it is possible to realize a variable beam split or deflection and power division. The iterative optimization algorithm can be a stochastic or randomized algorithm, for which a homogeneous power division or intensity distribution is specified as start values for example.

The phase setting devices serve to adjust the respective phase of the coherent laser beams and may be arranged at any desired location in front of the microlens arrangement where the coherent laser beams are separated from one another and no longer overlap. These phase setting devices are required, inter alia, because, e.g., thermal effects, vibrations or else air turbulence lead to optical path length differences in the individual channels. There are a number of options for realizing the phase setting devices, which are typically designed to set a variable phase lag: By way of example, the phase setting devices can be modulators in the form of EOMs (electro-optic modulators, for example in the form of liquid crystals), SLMs (spatial light modulators), optical retardation paths in the form of mirror arrangements, electro-mechanical modulators, for example in the form of piezo-mirrors, or the like. In the case where the coherent laser beams are guided in a fiber on the beam path upstream of the grid arrangement, it is possible to apply a tensile stress to the fiber, for example by means of piezo actuators, for the purposes of adjusting the phase; it is also possible to influence the temperature of the fiber, etc. The control device can be realized in the form of hardware and/or software, for example in the form of a microcontroller, an FPGA, an ASIC, etc. The control device is designed to suitably act on the phase setting devices, for example by way of suitable electronic (control) signals. Since the addition of a phase factor that is identical for all coherent laser beams does not change the result of the coherent beam combination, a total of N−1 phase setting devices are sufficient in the case of a total of N coherent laser beams to be combined in one direction.

The coherent laser beams produced in the laser source or sources can be guided to the grid arrangement with the aid of a plurality of beam guiding devices for example in the form of fibers. The individual beam guidance of the laser beams renders it possible to act thereon on an individual basis, in order to suitably set the relative phases with the aid of the phase setting device. The beam guiding devices may comprise an appropriate number of amplifiers or amplifier chains, for example in the form of fiber amplifiers, in order to amplify the laser beams before these are emitted in the direction of the microlens arrangement from the grid positions. The phase setting devices can be arranged upstream of the beam guiding devices or downstream of the beam guiding devices in the beam path, and/or can act on the beam guiding devices for example in the form of fibers. Alternatively, following the split in the splitting device, the coherent laser beams can reach the grid arrangement by way of free beam propagation, said grid arrangement for example being able to be located in a focal plane of a Fourier lens or at any other location where the coherent laser beams are spaced apart from one another to a sufficient degree. In the focal plane of such a Fourier lens or at the other location, the coherent laser beams—optionally after a suitable deflection—have the desired fill factor, that is to say a desired ratio between the extent or beam diameter of the respective laser beams in a respective spatial direction and the distance between the centers of adjacent laser beams, as was described further above.

In a development the control device is designed to adjust a respective fundamental phase of one of the coherent laser beams, in the case of which fundamental phase the beam combining device combines the coherent laser beams to form one laser beam that is diffracted into exactly one order of diffraction. Consequently, exactly one combined laser beam is produced in the case of the fundamental phase, said combined laser beam being diffracted into the zeroth order of diffraction (if present) or into an order of diffraction that differs from the zeroth order of diffraction in order to deflect the combined laser beam.

In a development the grid positions are arranged in a first direction and the control device is designed, for the purposes of combining the coherent laser beams to form the exactly one combined laser beam that is diffracted into the exactly one order of diffraction $B_{k,x}$ in the first direction, to set the respective fundamental phase $\delta\varphi_a$ of a coherent laser beam at an a-th grid position in the first direction which is given by:

$$\delta\varphi_a=-\pi N(m_a+B_{k,x})^2,$$

where the following applies:

$$m_a=-\frac{(N+1)}{2}+a$$

with a=1, . . . , N, where N is a number of the grid positions arranged in the first direction and where $B_{k,x}$ is an integer or half integer, for which the following applies:

$$-\frac{(N+1)}{2}\leq B_{k,x}\leq+\frac{(N+1)}{2}.$$

In the case where the number N of coherent laser beams is odd, the order of diffraction $B_{k,x}$ assumes integer values. In the case where an even number N of coherent laser beams are combined, the order of diffraction $B_{k,x}$ assumes half integer values.

In a development the grid positions in the grid arrangement are additionally arranged in a second direction that is preferably perpendicular to the first direction and the control device is designed, for the purposes of combining the coherent laser beams to form the exactly one combined laser beam that is diffracted into the exactly one order of diffraction $B_{k,x}$ in the first direction and into exactly one order of diffraction $B_{j,y}$ in the second direction, to set the respective fundamental phase $\delta\varphi_{a,b}$ of a coherent laser beam at an a-th grid position in the first direction and at a b-th grid position in the second direction which is given by:

$$\delta\varphi_a=-\pi/N(m_a+B_{k,x})^2-\pi/N(m_b+B_{j,y})^2,$$

where the following applies:

$$m_b=-\frac{(M+1)}{2}+b$$

with b=1, . . . , M, where M is a number of the grid positions arranged in the second direction and where $B_{j,y}$ is an integer or half integer, for which the following applies:

$$-\frac{(M+1)}{2}\leq B_{j,y}\leq+\frac{(M+1)}{2}.$$

In a further development the splitting device for splitting an input laser beam into the plurality of coherent laser beams is designed as a further microlens arrangement with at least two further microlens arrays, and the control device is designed, for the purposes of combining the coherent laser beams to form the exactly one combined laser beam that is diffracted into the exactly one order of diffraction $B_{k,x}$ in the first direction and preferably diffracted into the exactly one order of diffraction $B_{j,y}$ in the second direction, to set twice as much of the fundamental phases.

It was found that the values for the fundamental phases $\delta\varphi_a$, $\delta\varphi_{a,b}$ specified in the equations above need to be doubled for the special case that a respective microlens arrangement is used for dividing an input laser beam into the plurality of coherent laser beams and for combining the coherent laser beams. What applies in principle is that a doubling of the fundamental phases is required for the special case of two microlens arrangements, which optionally may have identical designs, in relation to the case where a fiber splitter or any other optical device is used for combination purposes. Consequently, doubling the fundamental phases is not restricted to the equations specified further above but applies in general.

In a further development the control device is designed to set the respective phase of one of the coherent laser beams that is composed of the respective fundamental phase and an additional phase. The additional phase facilitates a split of the combined laser beam into two or more orders of diffraction or a fast change in the order of diffraction into which the combined laser beam is diffracted. Preferably, the fundamental phases are chosen in such a way in the case described here that the beam combining device combines the coherent laser beams—without the additional phase—into the zeroth order of diffraction. An assumption is made below that the fundamental phases are chosen such that there is a combination of the laser beam into the zeroth order of diffraction as a result of the fundamental phases.

It was found that analytic relationships can be found for the choice or definition of the phases of the coherent laser beams in the case of discrete scanning in special cases, said analytic relationships being reproduced below.

In a development the grid positions are arranged spaced apart (equidistantly) in a first direction and the control device is designed, for the purposes of combining the coherent laser beams to form a single combined laser beam that is diffracted into an order of diffraction $B_{k,x}$ that differs from the zeroth order of diffraction, to set the respective additional phase $\Delta\varphi_a$ of a coherent laser beam at an a-th grid position in the first direction which is given by:

$$\Delta\varphi_a=-(2\pi/N)(a-(N+1)/2)B_{k,x},$$

where N denotes a number of the grid positions arranged in the first direction and $B_{k,x}$ denotes an integer or half integer, for which the following applies:

$$-\frac{(N+1)}{2} \le B_{k,x} \le +\frac{(N+1)}{2}.$$

In the first direction, the grid positions are arranged at the same distance from one another (equidistantly). In this case, the grid positions can be arranged on a line that extends in the first direction, that is to say the beam emergence directions or the Poynting vectors of the coherent laser beams are aligned parallel to one another. Alternatively, the grid positions can also be arranged equidistantly from one another on a circular arc, for example, which extends in or along the first direction.

In a development of this embodiment the grid positions of the grid arrangement are additionally arranged in a second direction that is perpendicular to the first direction and the control device is designed, for the purposes of combining the coherent laser beams to form a single combined laser beam that is diffracted into an order of diffraction $B_{k,x}$ in the first direction that differs from the zeroth order of diffraction and into an order of diffraction $B_{k,y}$ in the second direction that differs from the zeroth order of diffraction, to set an additional phase $\Delta\varphi_{a,b}$ of a coherent laser beam at an a-th grid position in the first direction and at a b-th grid position in the second direction which is given by:

$$\Delta\varphi_{a,b}=-((2\pi/N)(a-(N+1)/2)B_{k,x}+(2\pi/M(b-(M+1)/2)B_{j,y}))$$

where M denotes a number of the grid positions in the second direction and $B_{j,y}$ denotes an integer or half integer, for which the following applies:

$$-\frac{(M+1)}{2} \le B_{j,y} \le +\frac{(M+1)}{2}.$$

Observing the aforementioned conditions for the additional phases $\Delta\varphi_a$ or $\Delta\varphi_{a,b}$ and for the fundamental phases $\delta\varphi_a$ or $\delta\varphi_{a,b}$ facilitates a deflection without loss of efficiency. However, it is understood that the aforementioned conditions cannot be exactly observed in practice. The beam quality of the deflected laser beam deteriorates in the case where there is a deviation from the aforementioned conditions. Within the context of this application, the aforementioned conditions are considered satisfied if the right-hand side deviates by no more than 20%, preferably by no more than 10%, in particular by no more than 5% from the value $\Delta\varphi_a$ or $\Delta\varphi_{a,b}$ on the left-hand side, that is to say if the following applies: $|\Delta\varphi_a+2(\pi/N)(a-(N+1)/2)B_{k,x}|<0.2$, preferably <0.1, in particular <0.05. A corresponding statement also applies to $\Delta\varphi_{a,b}$, i.e., $|\Delta\varphi_{a,b}+((2\pi/N)(a-(N+1)/2)B_{k,x}(2\pi/M)(b-(M+1)/2))B_{j,y}|<0.2$, preferably <0.1, in particular <0.05. A corresponding statement also applies to the fundamental phases $\delta\varphi_a$ or $\delta\varphi_{a,b}$, i.e., $|\delta\varphi_a+\pi/N(m_a+B_{k,x})^2|<0.2$, preferably <0.1, in particular <0.05 or $|\delta\varphi_{a,b}+\pi/N(m_a+B_{k,x})^2+\pi/M(m_b+B_{j,y})^2|<0.2$, preferably <0.1, in particular <0.05.

The additional phase $\Delta\varphi_{a,b}$ is set at an a-th grid position in the first direction, which simultaneously forms a b-th grid position in the second direction. In the case where the grid positions in the grid arrangement are arranged only in the first direction the coherent laser beams are combined to form a single laser beam which is diffracted into the zeroth order of diffraction in the second direction (i.e., $B_{k,y}=0$). Consequently, the formula for the additional phase $\Delta\varphi_a$ specified further above arises for the one-dimensional case.

In this development, a plurality of N×M laser beams, rather than a one-dimensional coherent combination of a laser beams, are combined in two dimensions to form one or more laser beams. In this case, the grid positions are arranged in a two-dimensional grid arrangement, with the distances between adjacent grid positions typically being the same in both directions if the number of grid positions is the same in both directions (i.e., N=M) or—should N not equal M—being chosen to be different. In this case, the grid or the grid arrangement with the grid positions can extend in a plane (e.g. XY-plane) or on a curved surface, for example on a spherical shell. The laser beams emanating from the grid positions are typically aligned in parallel in the first case and can in the second case be aligned for example in the direction of the center of the spherical shell, where the microlens arrangement is arranged.

In this case, the periodicity of the grid with the grid positions specifies the pitches of the microlenses in two different, for example perpendicular directions (X, Y). In this case, it is possible to use a 2-dimensional microlens array whose pitches $p_x$, $p_Y$ optionally differ in the two perpendicular directions X, Y on the basis of the periodicity of the grid. Accordingly, the microlenses of the 2-dimensional microlens array have an optionally different curvature in the X-direction and in the Y-direction, that is to say these are not cylindrical lenses. It is also possible to form a 2-dimensional microlens array by combining two 1-dimensional microlens partial arrays with cylindrical lenses, with the cylindrical lenses of the 1-dimensional microlens partial arrays being aligned perpendicular to one another and being arranged in the same plane, that is to say even in this case the microlens arrangement has only a single microlens array and does not act as an imaging homogenizer.

The relationship between the 2-dimensional grid with the grid positions and the 2-dimensional microlens array is analogous to the relationship between the Bravais lattice and the reciprocal lattice. Accordingly, the arrangement of the grid positions can also correspond to the highest density packing, that is to say a hexagonal lattice. The microlenses of the microlens array are likewise arranged in a hexagonal arrangement in this case.

In an embodiment, the control device is designed to vary the respective phase of one of the coherent laser beams on the basis of an arrangement of the respective grid position within the grid arrangement in order to change an order of diffraction into which the at least one combined laser beam is diffracted. In this way it is possible to realize an extremely quick, discrete scanning process, within the scope of which the at least one diffracted laser beam jumps or is moved back and forth between different orders of diffraction. In this case, the apparatus can serve as a scanner device or as a beam shaping unit.

The scanning process can be carried out using a laser beam that is diffracted into a single order of diffraction, but it is also possible to realize a discrete scanning process using a laser beam that is split among two or more orders of diffraction (at most ±(N−1)/2 orders of diffraction), that is to say using two or more combined laser beams. In this case, the phase relationship or the phase of a respective coherent laser beam required to diffract or split the combined laser beam into at least two different orders of diffraction can be set with the aid of the control device. By varying the phase of the coherent laser beams, it is possible to change the power distribution among the various orders of diffraction into which the at least two combined laser beams are diffracted. In this way it is possible to implement a discrete scanning process with a number of combined laser beams, with the scan field being between the −((N−1)/2)-th order of diffraction and the (N−1)/2-th order of diffraction and N denoting the number of coherent laser beams (in the respective scanning direction).

The control device can set or vary the respective phase of the coherent laser beams on the basis of a parameter table stored in a memory device in order to move the at least one combined laser beam along a specified (discrete) trajectory. The respective phases to be set can also be specified to the control device from the outside, for example by a user, or the phases to be set can be specified or varied on the basis of at least one measured variable which is measured for example with the aid of a sensor arrangement, that is to say there can be closed-loop control of the phases to a respective target value. In the case of the at least one combined laser beam or at least one combined laser beam not being diffracted into the zeroth order of diffraction during the beam combination, it is generally necessary to use a sensor array or optionally a spatially resolving sensor for the phase detection.

In the case where the combined laser beam is imaged by means of a lens or an imaging optical unit, the (at least one) combined laser beam no longer propagates along the optical axis but with a parallel offset from the optical axis. The magnitude of the parallel offset of the combined laser beam depends on the higher order of diffraction (±1, ±2; ±0.5, ±1.5, etc.), into which said combined laser beam is diffracted. In the case where the grid positions are arranged in a two-dimensional grid arrangement, the (at least one) combined laser beam can thus be offset in two typically perpendicular directions parallel to the optical axis, to be precise within a further grid arrangement that corresponds to the grid arrangement of the coherent laser beams.

In a development the control device is designed to vary the respective additional phase of the coherent laser beams for the purposes of changing a first order of diffraction, into which a first combined laser beam is diffracted, and/or for the purposes of changing a second order of diffraction, into which a second combined laser beam is diffracted. In this embodiment the coherent laser beams are combined by the beam combining device to form at least two diffracted laser beams. To achieve this, the respective (additional) phases of the combined laser beams are suitably chosen, for the purposes of which an iterative, for example stochastic, optimization algorithm can be used in order to vary or set the (±(N−1)/2-th or zeroth) order of diffraction of the first combined laser beam and the (±(N−1)/2-th or zeroth) order of diffraction of the second combined laser beam in a targeted manner. It is understood that variable beam splitting is not restricted to two combined laser beams but can also be performed with more than two combined laser beams.

In a further embodiment the control device is designed to adjust a respective additional phase of the coherent laser beams for the purposes of producing a specified, in particular different power of the at least two combined laser beams that are diffracted into different orders of diffraction. In particular, the control device can be designed to vary the respective additional phase of one of the coherent laser beams on the basis of an arrangement of the respective grid position of the coherent laser beam within the grid arrangement, in order to change the specified, in particular different power or the power distribution over time.

The input power can be distributed equally among the respective combined laser beams but it is also possible to implement a specified, differing distribution of the input power among the at least two laser beams combined in different orders of diffraction, and optionally to vary this distribution over time.

In the case where the coherent laser beams are combined to form a first combined laser beam that is diffracted into the zeroth order of diffraction and a second combined laser beam that is diffracted into the ±1st order of diffraction in the first direction, the input power p can for example be split among the 0th and the ±1st order of diffraction as follows: $p_0=C\,p$; $p_{\pm1}=(1-C)p$, where $0<C<1$. For the two cases of C=1 and C=0, respectively, only one combined laser beam is produced, which is diffracted into the 0th or into the ±1st order of diffraction. In the case of C=0.5, half of the input power p is diffracted into the 0th order of diffraction and the other half is diffracted into the ±1st order of diffraction.

For the additional phase of a respective coherent laser beam at an a-th grid position in the first direction, which produces the aforementioned power distribution with the factor C, the following applies:

$$\Delta\varphi_a=\pm C(2\pi/N)(a-(N+1)/2),$$

where a component of the input power p is diffracted into the −1st order of diffraction for a positive sign in the equation above and a component of the input power is diffracted into the +1st order of diffraction for a negative sign in the equation above. The equation above can be generalized to the two-dimensional case in a manner analogous to the aforementioned equations for the additional phase $\Delta\varphi_a$, with the following formula arising for the additional phase $\Delta\varphi_{a,b}$:

$$\Delta\varphi_{a,b}=\pm C(2\pi/N)(a-(N+1)/2)\pm C(2\pi/M)(b-(M+1)/2).$$

The factor C can be chosen to be constant or can be varied in a time-dependent manner. In the latter case, the apparatus can be operated in the style of an acousto-optic or electromechanical component in the form of deflectors or modulators. The formulae above for the additional phase apply generally for the case where the input power is intended to be split between two immediately adjacent orders of diffraction. For the case where the fundamental phase is set such that there is a diffraction of the coherent laser beams into the +1st order of diffraction, the input power is split between the +1st order of diffraction and the +2nd order of diffraction.

In the case of a number M of more than two combined laser beams, the split can for example be realized in the form of a (linear) power ramp, in the case of which a first combined laser beam is diffracted with a maximum power $p_{k,max}$ into the k-th order of diffraction and the remaining M−1 combined laser beams are diffracted into the remaining M−1 orders of diffraction with a power that has been reduced in relation to the maximum power $p_{k.max}$. By way of example, for the power distribution in the form of a power wedge, the following may apply: a/M $p_{k,max}$, where a =1, . . . , M. For the example of a total of five diffracted combined laser beams, proportions of the maximum power $p_{k,max}$ of 100%, 80%, 60%, 40% and 20% arise.

A further aspect of the invention relates to a laser system, comprising: a seed laser source for producing a seed laser beam, and an apparatus as described further above for combining the plurality of coherent laser beams, with the seed laser beam preferably forming the input laser beam of the apparatus. The seed laser source is preferably designed to produce the seed laser beam with a spectral bandwidth of less than 100 nm, particularly preferably less than 50 nm, in particular less than 10 nm, and preferably with a spatial fundamental mode (single mode laser beam). The seed laser beam can be guided to the apparatus either directly or by way of suitable beam-guiding optical elements. Prior to entry into the above-described apparatus, the seed laser beam may be amplified in at least one optical amplifier. Particularly in this case it is possible to optionally completely dispense with the provision of amplifiers, for example in the form of gain fibers, for amplifying the individual coherent laser beams in the apparatus. As a result of amplifying the seed laser beam prior to entry into the apparatus it is optionally possible to dispense with active closed-loop control of the phases of the individual coherent laser beams. In this case, a static phase—or varying phase for the targeted modification of the respective order of diffraction—can be set at the respective phase setting devices, and need not be corrected. Alternatively, it is possible for the input laser beam itself to be a combined laser beam, as will be described in more detail below.

In an embodiment the laser system additionally comprises a further apparatus for combining a plurality of further coherent laser beams, comprising: a further splitting device for splitting the seed laser beam or the (further) input laser beam into the plurality of further coherent laser beams, a plurality of further phase setting devices for adjusting a respective phase of one of the further coherent laser beams, and a further beam combining device for combining the further coherent laser beams emanating from a plurality of further grid positions of a further grid arrangement, with the further beam combining device comprising a further microlens arrangement having at least one further microlens array, and a further control device which is designed to adjust the respective phase of one of the further coherent laser beams on the basis of an arrangement of the respective further grid position within the further grid arrangement in order to combine the coherent further laser beams to form exactly one laser beam that is diffracted into exactly one order of diffraction, said diffracted laser beam forming the input laser beam of the splitting device of the apparatus. To avoid the above-described problems in the case of high mean laser powers, it was found to be advantageous if the further microlens arrangement also comprises exactly one microlens array; however, this is not mandatory. In particular, the power of the coherent laser beams in further apparatus can be so low that the use of two (or more) microlens arrays is also possible.

In this case, the further control device of the further apparatus is designed or programmed to combine the further coherent laser beams to form a laser beam that is diffracted into the zeroth order of diffraction or into an order of diffraction that differs from the zeroth order of diffraction, by virtue of the fundamental phases described further above in conjunction with the apparatus being set.

In this embodiment, a further apparatus for combining a plurality of further coherent laser beams is used to produce the input laser beam for the apparatus described further above. In this case, the further apparatus forms an amplified combined further laser beam, which forms the input laser beam of the apparatus, from the seed laser beam. In this case it is also possible to optionally completely dispense with the provision of amplifiers within the apparatus, in particular in the beam path downstream of the splitting device. Since an amplified input laser beam is input coupled into the apparatus it is optionally possible to dispense with an active phase adjustment or closed-loop phase control in the apparatus such that the deflection of the at least one combined laser beam in the apparatus is not slowed down by closed-loop phase control. An active stabilization of the phase settings by means of a control loop, which is provided in the further apparatus for combining the further coherent laser beams, is simplified in this case since only the zeroth order of diffraction needs stabilization.

A further aspect of the invention relates to a method for combining a plurality of coherent laser beams, in particular by means of the above-described apparatus, the method comprising: input coupling the plurality of coherent laser beams emanating from a plurality of grid positions arranged in a grid arrangement into a microlens arrangement having exactly one microlens array, and combining the coherent laser beams in the microlens arrangement to form at least one combined laser beam. As was described further above, the coherent combination of the laser beams with a sufficient combination efficiency can also be obtained with the aid of a single microlens array should the parameters be suitably chosen, as described further above in the context of the apparatus.

In a variant, the method comprises: adjusting a respective phase of one of the coherent laser beams on the basis of an arrangement of the respective grid position in the grid arrangement in order to combine the coherent laser beams to form at least one laser beam that is diffracted into at least one order of diffraction, with the method preferably comprising: varying the respective phase of the coherent laser beams on the basis of an arrangement of the respective grid position within the grid arrangement in order to change an order of diffraction into which the at least one combined laser beam is diffracted. As a result of varying the phases there can be a highly dynamic, discrete scanning process in one or two directions.

As was described further above in conjunction with the apparatus, the method for combining the plurality of laser beams can also deviate in a targeted fashion from the fundamental phases or from phase differences between the coherent laser beams for a combination in the zeroth or in a higher order of diffraction which is optimized in view of beam quality in order to carry out a controlled, fast beam deflection or controlled beam split. In the case of a beam deflection or the beam split with suitably chosen additional phases of the individual coherent laser beams there is a negligible loss of efficiency for the respective order of diffraction. The additional phases of the individual coherent laser beams may in particular satisfy the equations for $\Delta\varphi_a$ or for $\Delta\varphi_{a,b}$, which are specified further above in the context of the laser system or the apparatus. The fundamental phases $\delta\varphi_a$ and $\delta\varphi_{a,b}$ typically also satisfy the equations described further above in the context of the apparatus.

In a further variant the method comprises: varying the respective additional phases of the coherent laser beams for the purposes of changing a first order of diffraction, into which a first combined laser beam is diffracted, and/or for the purposes of changing a second order of diffraction, into which a second combined laser beam is diffracted, proceeding from a respective fundamental phase in the case of which the beam combining device combines the coherent laser beams to form a single laser beam that is diffracted into exactly one order of diffraction.

As was described further above, varying the phases can realize a highly dynamic beam split, in the case of which two, three or optionally more (at most N or N×M) combined laser beams can be produced and/or in the case of which the position or the alignment of at most N−1 or at most (N−1)×(M−1) combined laser beams can be changed. It is understood that the scanning process described further above in the context of a single combined laser beam can also be combined with the split among two or more combined laser beams.

In a further variant the method comprises: adjusting a respective additional phase of the coherent laser beams for the purposes of producing a specified, in particular different power of the at least two combined laser beams that are diffracted into different orders of diffraction proceeding from a respective fundamental phase, in the case of which the beam combining device combines the coherent laser beams to form a single laser beam that is diffracted into exactly one order of diffraction. As was described further above in the context of the apparatus, the input power can be distributed equally among the two or more combined laser beams but it is also possible to deviate from an equal distribution among the plurality of combined laser beams in a targeted fashion.

As was described further above, it is advantageous if the coherent laser beams and the microlens arrangement satisfy the conditions $N=p_x^2/(\lambda_L f_{ML})$ and $M=p_Y^2/(\lambda_L f_{ML})$ specified above (with an identical focal length $f_{ML}$ being assumed). It is also advantageous if adjacent coherent laser beams are input coupled into the microlens array with a specified angle difference $\delta\theta_x$ or $\delta\theta_y$, for which the following applies: $\delta\theta_x=\lambda_L/p_x$ or $\delta\theta_y=\lambda_L/p_y$.

Further advantages of the invention will become apparent from the description and the drawing. Likewise, the features mentioned above and those that will be explained further can be used in each case by themselves or as a plurality in any desired combinations. The embodiments shown and described should not be understood as an exhaustive enumeration, but rather are of illustrative character for outlining the invention.

In the following description of the drawings, identical reference signs are used for identical or functionally identical components.

FIG. 1*a* shows an exemplary structure of a laser system 1 which comprises a laser source 2 for producing a seed laser beam 2*a*. To this end, the laser source 2 comprises a mode-coupled fiber-master oscillator, which produces the seed laser beam 2*a* at a laser wavelength 4. The seed laser beam 2*a* of the laser source 2 is fed as an input laser beam 9 to an apparatus 5 for combining a number N of coherent laser beams 3.1, 3.2, . . . , 3.N. The apparatus 5 comprises a conventional 1-to-N splitting device 4, for example in the form of a fiber splitter, in order to split the input laser beam 9, which corresponds to the seed laser beam 2*a*, into the number N of coherent laser beams 3.1, . . . , 3.N. The coherent laser beams 3.1, . . . , 3.N run through a corresponding number N of phase setting devices 6.1, . . . , 6.N, which allow a respective individual phase $\delta\varphi_a+\Delta\varphi_a$ of the coherent laser beams 3.1, . . . , 3.N (a=1, . . . , N) to be set by virtue of bringing about a suitable phase lag. By way of example, the phase setting devices 6.1, . . . , 6.N can be designed as electro-optic modulators or deflectors, for example using liquid crystals, as acousto-optic modulators or deflectors, as electromechanical modulators or deflectors, for example in the form of actuatable piezo-mirrors, etc.

After the phase setting devices 6.1, . . . , 6.N, the coherent laser beams 3.1, . . . , 3.N run through a corresponding number N of gain fibers 7.1, . . . , 7.N in order to amplify the coherent laser beams 3.1, . . . , 3.N. The end faces of the gain fibers 7.1, . . . , 7.N serve as emission surfaces or form grid positions 8.1, . . . , 8.N at which the coherent laser beams 3.1, . . . , 3.N are emitted. The phase setting devices 6.1, . . . , 6.N may also be arranged downstream of the gain fibers 7.1, . . . , 7.N or may act directly on the gain fibers 7.1, . . . , 7.N, for example by virtue of producing an adjustable mechanical stress on the gain fibers 7.1, . . . , 7.N.

The coherent laser beams 3.1, . . . , 3.N can be deflected to a deflection device with a plurality of deflection mirrors, not depicted here, in order to increase the fill factor, that is to say to reduce the distance between adjacent laser beams 3.1, . . . , 3.N or grid positions 8.1, . . . , 8.N. It is understood that the deflection device is not mandatory. In the example shown, the coherent laser beams 3.1, . . . , 3.N enter a beam combining device 10 when aligned parallel to one another, said beam combining device comprising a microlens arrangement 11 in the form of a non-imaging homogenizer with one microlens array 17 for coherently combining the laser beams 3.1, . . . , 3.N in order to form a combined laser beam 12 or a plurality of combined laser beams 12*a,b* (the latter not being shown in FIG. 1*a*).

As is evident from FIG. 1*a*, a component 12*c* of the combined laser beam 12 is output coupled via an output coupling device in the form of a partly transmissive mirror 13 and is incident on a spatially resolving detector 14, for example in the form of a sensor array or a camera. The detector 14 is signal-connected to a control device 15 of the laser system 1, the control device controlling the phase setting devices 6.1, . . . , 6.N in order to adjust the individual phases $\delta\varphi_a+\Delta\varphi_a$ of the laser beams 3.1, . . . , 3.N on the basis of the properties of the detected component 12*a* of the combined laser beam 12. The control device 15 can in particular facilitate closed-loop control of the phase setting devices 6.1, . . . , 6.N in order to produce desired (target) phases $\delta\varphi_a+\Delta\varphi_a$ of the laser beams 3.1, . . . , 3.N on the basis of the properties of the detected component 12*a* of the combined laser beam 12.

Even though the number N of phase setting devices 6.1, . . . , 6.N corresponds to the plurality N of laser beams 3.1, . . . , 3.N in the example shown, a number of N−1 phase setting devices 6.1, . . . , 6.N−1 is generally sufficient. In the laser system 1 shown in FIG. 1*a*, it is possible firstly to attain a high beam quality of, e.g., M=1.3 of the combined laser beam 12 and secondly to attain a significant increase in the power of the laser beams 3.1, . . . , 3.N as a result of the gain in the gain fibers 7.1, . . . , 7.N.

Figure 1B:
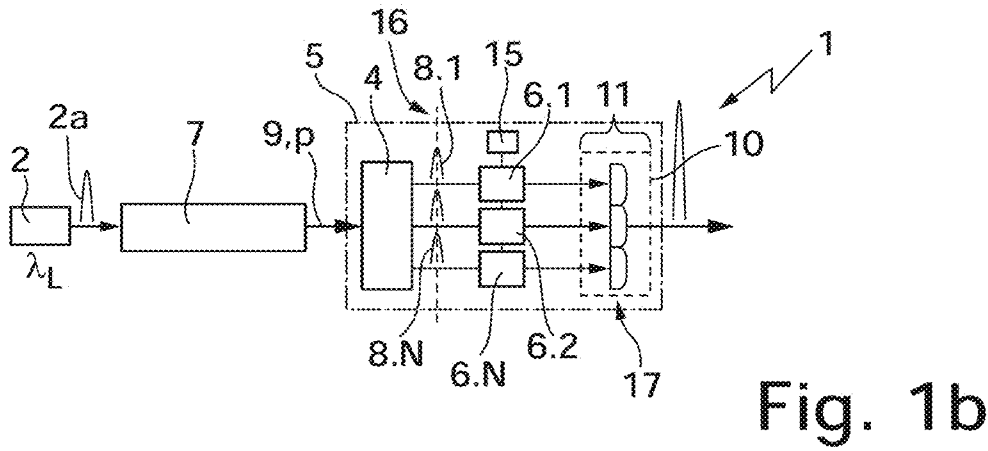
FIG. 1*b* shows a schematic representation of a laser system analogous to FIG. 1*a*, wherein an amplified seed laser beam is supplied to the apparatus.

FIG. 1*b* shows a laser system 1 which substantially differs from the laser system 1 shown in FIG. 1*a* in that the coherent laser beams 3.1, . . . , 3.N in the apparatus 5 are not amplified with the aid of a plurality of gain fibers 7.1, . . . , 7.N or with the aid of other optical amplifiers. Rather, the seed laser beam 2*a* is amplified in a gain fiber 7 in the laser system 1 shown in FIG. 1*b*. The amplified seed laser beam 2*a* is supplied to the apparatus 5 as input laser beam 9. The apparatus 5 of FIG. 1*b* is designed analogously to the apparatus 5 shown in FIG. 1*a*. The splitting device 4 can be designed in various ways, for example as a beam splitter, e.g., in the form of a plurality of series-connected beam splitter cubes, as a polarization beam splitter, as a segmented mirror or as a microlens arrangement with (at least) two microlens arrays. The use of two microlens arrays for beam splitting is possible even at relatively high powers if the system parameters are suitably chosen (small form factor, large pitch) so that the second microlens array is not arranged in the focal plane of the first microlens array.

In the case of a splitting device in the form of a microlens array, the grid positions 8.1, . . . , 8.N of the coherent laser beams 3.1, . . . , 3.N are not formed at the end faces of the gain fibers 7.1, . . . , 7.N but are situated in a focal plane of a microlens array, second in the beam path, of the splitting device 4, that is to say in the far field or the focal plane of the second microlens array of the splitting device 4. The grid positions 8.1, . . . , 8.N of the coherent laser beams 3.1, . . . , 3.N in the focal plane form a grid arrangement 16, in which adjacent grid positions 8.1, . . . , 8.N have the same distance from one another, that is to say are arranged equidistantly.

In the apparatus 1 shown in FIG. 1*b*, the phase setting devices 6.1, . . . , 6.N are designed to set the phases $\delta\varphi_a+\Delta\varphi_a$ of the laser beams 3.1, . . . , 3.N in free-beam propagation. By way of example, the phase setting devices 6.1, . . . , 6.N can be electro-optic or acousto-optic modulators or deflectors. In the case of the apparatus 5 shown in FIG. 1*b*, the control device 15 also serves to control the phase setting devices 6.1, . . . , 6.N. The active control of the phases $\delta\varphi_a+\Delta\varphi_a$ of the laser beams 3.1, . . . , 3.N described in the context of FIG. 1*a* can be dispensed with in the apparatus 5 shown in FIG. 1*b*, at least in the case where the radiant fluxes of the laser beams 3.1, . . . , 3.N are not too high, that is to say the control device 15 can set the (static) target phases $\delta\varphi_a+\Delta\varphi_a$ at the phase setting devices 6.1, . . . , 6.N without a correction being required. On account of the non-required active phase adjustment or control, deflection of the laser beam or the combined laser beams 12, 12*a,b* can be quicker in the case of the apparatus 5 than in the case for the apparatus 5 shown in FIG. 1*a*.

Figure 1C:
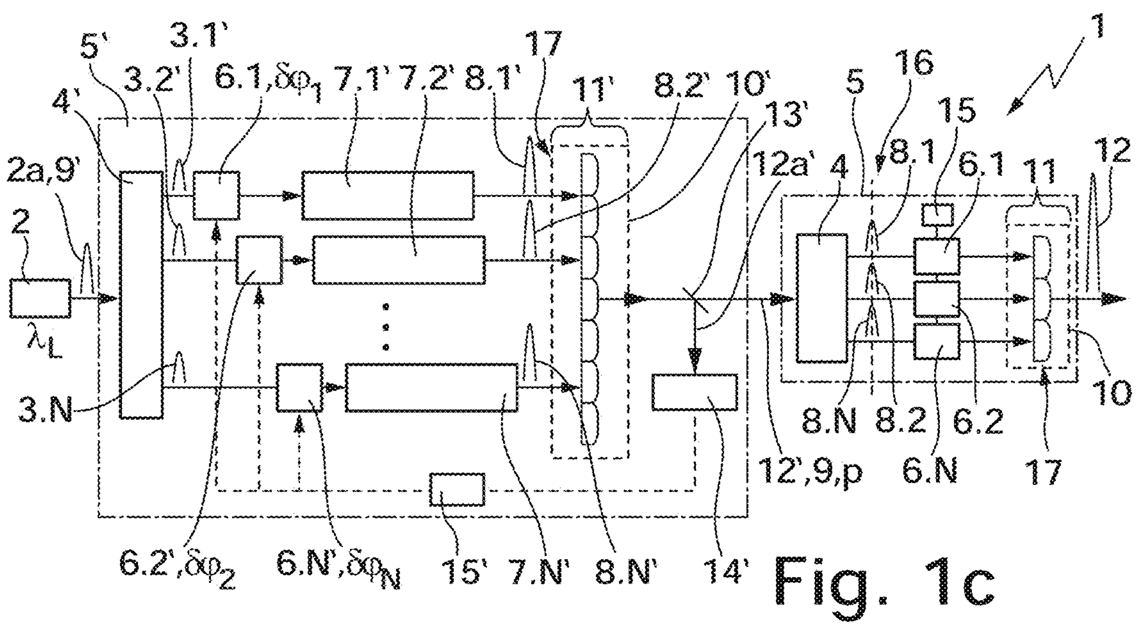
FIG. 1*c* shows a schematic representation of a laser system analogous to FIG. 1*b*, having a further apparatus for combining coherent laser beams which serves to amplify the seed laser beam.

FIG. 1*c* shows a laser system 1 which has the same form as that of FIG. 1*b*, with the laser system 1 of FIG. 1*c* comprising a further apparatus 5' for combining a plurality N of further laser beams 3.1', . . . , 3.N', instead of the amplifier 7 shown in FIG. 1*b*, for the purposes of amplifying the seed laser beam 2*a*, the further apparatus being designed analogously to the apparatus 5 shown in FIG. 1*a*. The seed laser beam 2*a* is fed to the further apparatus 5' as an input laser beam 9', and is split into a number N of further coherent laser beams 3.1', . . . , 3.N' by means of a further 1-to-N splitting device 4'. The number N of further coherent laser beams 3.1, . . . , 3.N run through a corresponding number N of further phase setting devices 6.1', . . . , 6.N', which allow a respective individual (fundamental) phase $\delta\varphi_a$ of the further coherent laser beams 3.1', . . . , 3.N (a=1, . . . , N) to be set by virtue of bringing about a suitable phase lag.

After the further phase setting devices 6.1', . . . , 6.N', the further coherent laser beams 3.1', . . . , 3.N' run through a corresponding number N of further gain fibers 7.1', . . . , 7.N' in order to amplify the further coherent laser beams 3.1', . . . , 3.N'. The end faces of the further gain fibers 7.1', . . . , 7.N' serve as emission surfaces or form further grid positions 8.1', . . . , 8.N' at which the further coherent laser beams 3.1', . . . , 3.N are emitted. The individual phases $\delta\varphi_a$ of the further coherent laser beams 3.1', . . . , 3.N are controlled with the aid of a further control device 15' or are controlled on the basis of a detector signal of a further detector 14', the latter detecting a component 12*a'* of the further laser beam 12' combined with the aid of the further apparatus 5', said component being output coupled at a further output coupling device 13'.

The control device 15' of the further apparatus 5' shown in FIG. 1*c* is designed or programmed to set the individual (fundamental) phases $\delta\varphi_a$ of the further coherent laser beams 3.1', . . . , 3.N' on the basis of an arrangement of the further grid position 8.1', . . . , 8.N' assigned to the respective further laser beam 3.1', . . . , 3.N so that the coherent further laser beams 3.1', . . . , 3.N are combined to form a laser beam 12' that is diffracted into the zeroth order of diffraction. The combined laser beam 12' forms the input laser beam 9 for the apparatus 5 for combining the coherent laser beams 3.1, . . . , 3.N, which is designed as depicted in FIG. 1*b*. By amplifying the seed laser beam 5 in the further apparatus 5', it is possible like in FIG. 1*b* to dispense with the amplification of the input laser beam 9 in the apparatus 5.

The laser systems 1 shown in FIG. 1*a-c* are suitable for high mean laser powers of the order of kW and high pulse energies of the order of mJ since the beam combining device 10 and the microlens arrangement 11 each have only one microlens array 17, 17'.

Figures 2A, 2B:
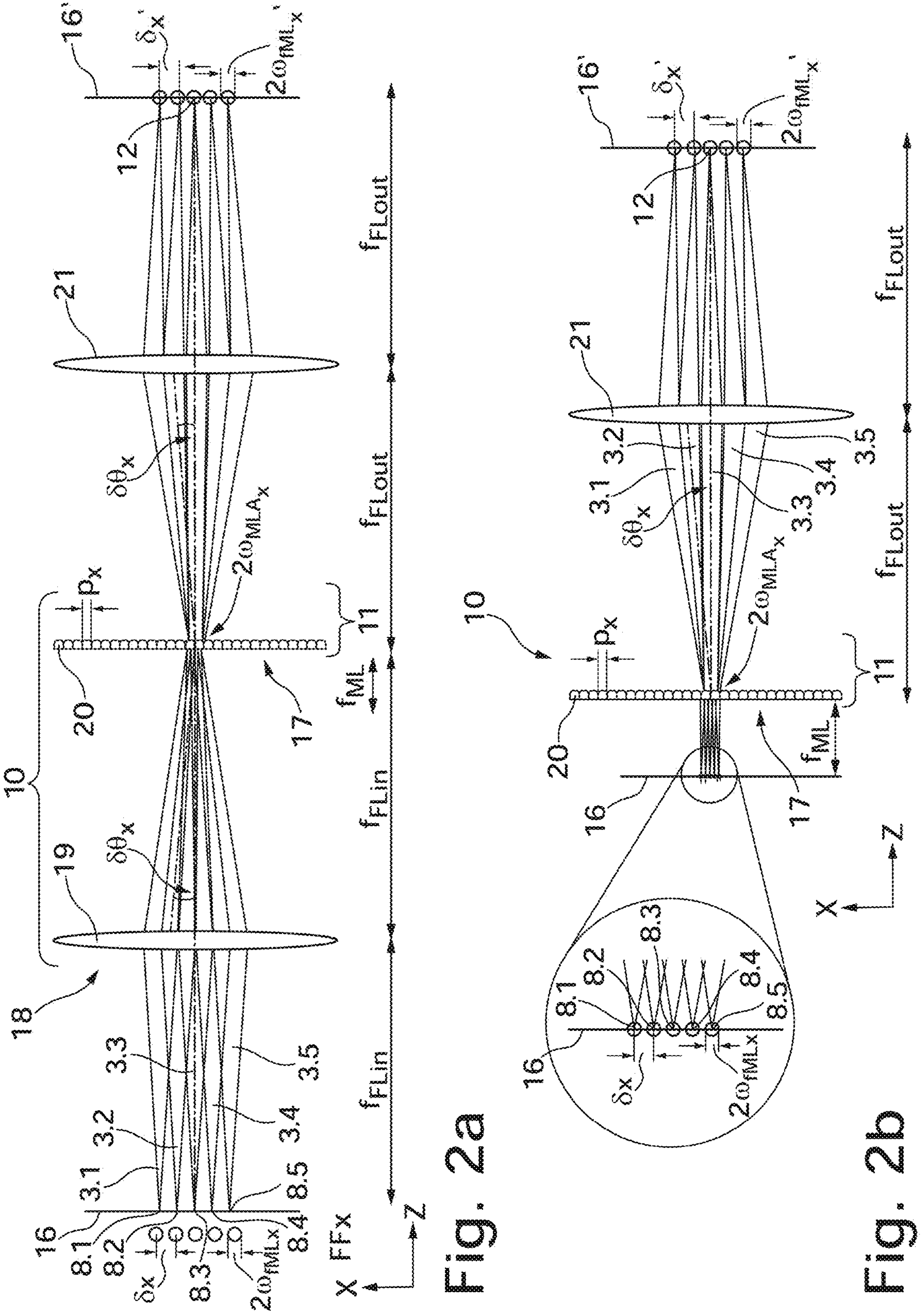
FIG. 2*a* shows a representation of a beam combining device of the laser system of FIGS. 1*a-c*, which comprises an input coupling optical unit and a microlens arrangement having a single microlens array.
FIG. 2*b* shows a representation of a beam combining device of the laser system of FIGS. 1*a-c*, which comprises a microlens arrangement having a microlens array without an input coupling optical unit.

FIG. 2*a* shows a beam combining device 10 analogous to the apparatus 5 of FIGS. 1*a-c* for combining an (exemplary) number of N=5 coherent laser beams 3.1, . . . , 3.5. The beam combining device 10 comprises a microlens arrangement 11 having exactly one microlens array 17, and comprises an input coupling optical unit 18. Five phase setting devices not depicted in FIG. 2*a* serve to adjust the phases $\delta\varphi_1+\Delta\varphi_1, \ldots, \delta\varphi_5+\Delta\varphi_5$ of the five laser beams 3.1, . . . , 3.5, in such a way that, in combination with the input coupling optical unit 18, a phase front is formed at the microlens arrangement 11, which facilitates a coherent combination of the laser beams 3.1, . . . , 3.5 to form the combined laser beam 12, where possible while completely maintaining the beam quality. In this case, the grid positions 8.1, . . . , 8.5 are arranged in a line in the X-direction and the laser beams 3.1, . . . , 3.5 enter the input coupling optical unit 18 with a parallel alignment along a uniform propagation direction (Z-direction).

In this case, the grid positions 8.1, . . . , 8.5 and the coherent laser beams 3.1, . . . , 3.5 are arranged equidistantly, that is to say with same distances $\delta x$, along the X-direction. The input coupling optical unit 18 is designed to input couple adjacent coherent laser beams 3.1, . . . , 3.5 into the microlens arrangement 11 or the microlens array 17 with a specified angle difference $\delta\theta_x$, for which the following applies: $\delta\theta_x=\lambda_L/p_x$, where $\lambda_L$ denotes the (uniform) wavelength of the laser beams 3.1, . . . , 3.5 and $p_x$ denotes a pitch of the microlenses 20 of the microlens array 17 in the X-direction.

To produce the angle difference $\delta\theta_x$, the input coupling optical unit 18 comprises a focusing device in the form of a focusing lens 19, more precisely a cylindrical lens, which focuses the laser beams 3.1, . . . , 3.5 on the microlens arrangement 11, more precisely on the microlens array 17 of the microlens arrangement 11. To satisfy the condition in relation to the angle difference $\delta\theta_x$, the grid positions 8.1, . . . , 8.5 in the example shown in FIG. 2*a* are arranged in a one-dimensional grid arrangement 16 with a distance $\delta x$ given by $\delta x=\lambda_L f_{FLin}/p_x$, where $f_{FLin}$ denotes the focal length of the focusing lens 19, which in FIG. 2 is arranged at a distance of its focal length $f_{FLin}$ from the microlens array 17.

As an alternative to the arrangement on a common line, the grid positions 8.1, . . . , 8.5 may also be arranged in a one-dimensional grid arrangement 16 on a circular arc extending in the X-direction. In this case, coherent laser beams 3.1, . . . , 3.5 at the respective grid positions 8.1, . . . , 8.5 are aligned with respect to one another at a respective difference angle $\delta\theta_x=\lambda_L/p_x$.

Under the assumption that the intensities of the laser beams 3.1, . . . , 3.5 emanating from the grid positions 8.1, . . . , 8.5 are the same size, the coherently superposed laser beam 12 shown in FIG. 2*a* can be produced by means of the microlens arrangement 11 if the microlens array 17 and the combined laser beams 3.1, . . . , 3.5 satisfy the following equation (1):

$$N=p_x^2/(\lambda_L f_{ML}) \quad (1)$$

where N denotes the number of coherent laser beams (in this case: N=5) and fives, denotes the focal length of the microlens array 17. Equation (1) should be observed as exactly as possible since deviations lead to a deterioration of the beam quality of the combined laser beam 12.

The laser beams 3.1, . . . , 3.5 that emanate from the grid positions 8.1, . . . , 8.5 are single mode beams in the example shown, that is to say these each have a Gaussian profile. Alternatively, the laser beams 3.1, . . . , 3.5 can have a different beam profile with an optionally reduced degree of spatial coherence, for example a donut-shaped beam profile or a top hat beam profile. The beam diameter, more precisely the full width at half maximum of the beam profile of the coherent laser beams 3.1, . . . , 3.5, which is Gaussian in the example shown, is denoted by 2 $\omega_{FLMLx}$ in FIG. 2*a*. The fill factor $FF_x$ of the coherent laser beams 3.1, . . . , 3.N in the X-direction is defined as the ratio of the beam diameter 2 $\omega_{FLMLx}$ to distance δx between adjacent coherent laser beams 3.1, . . . , 3.N: $FF_x=2\ \omega_{FLMLx}/\delta x$. The beam diameter 2 $\omega_{FLAx}$, more precisely the $1/e^2$ width, of the combined laser beam 12 on the microlens array 17 depends on the fill factor $FF_x$ according to the formula below: $2\ \omega_{FLAx}=4\ p_x/(\pi FF_x)$.

The beam combining device 10 represented in FIG. 2*b* differs from the beam combining device 10 represented in FIG. 2*a* in that there is no input coupling optical unit 18, in particular no Fourier lens 19, present. The grid arrangement 16 with the grid positions 8.1, . . . , 8.5 arranged at equidistant distances δx is arranged in the focal plane of the microlens array 17 upstream of the microlens array 17 in the case of the beam combining device 10 represented in FIG. 2*b*, that is to say at the distance of the focal length $f_{ML}$ upstream of the microlens array 17. What is exploited here is that on account of the Talbot effect the brightness distribution of the microlens array 17 is repeated in the focal plane in which the grid arrangement 16 is arranged. Accordingly, the beam combining device 10 shown in FIG. 2*b* requires that the grid positions 8.1, . . . , 8.N are arranged at a distance δx from one another which corresponds to the pitch $p_x$ of the microlenses 20 of the microlens array 17 in the X-direction, that is to say the following applies: $\delta x = p_x$.

The focal length $f_{ML}$ of the microlens array 17 is typically less than approximately 70-80 mm and is less than the Rayleigh length of the laser beams 3.1, . . . , 3.5 such that the condition in relation to the angle difference $\delta\theta_x$ between adjacent coherent laser beams 3.1, . . . , 3.5 need not be observed. Accordingly, the coherent laser beams 3.1, . . . , 3.5 can be radiated with a mutually parallel alignment onto the microlens array 17 in the case of the beam combining device 10 represented in FIG. 2*b*.

The divergence of the laser beams 3.1, . . . , 3.5 at the grid positions 8.1, . . . , 8.5 which for example may correspond to the end faces of gain fibers as emission surfaces and from which a respective laser beam 3.1, . . . , 3.5 emanates also has a negligible influence on the combination efficiency on account of the small distance $f_{ML}$ from the microlens array 17. Optionally, the beam profile of the laser beams 3.1, . . . , 3.N can be adapted with the aid of a suitable beam shaping device, for example by virtue of said laser beams being collimated or focused, that is to say the grid positions 8.1, . . . , 8.5 need not necessarily correspond to the emission surfaces on the end faces of the fibers but may for example be located in the focal plane of a plurality of (e.g., spherical) focusing lenses.

The provision of such a beam shaping device may be expedient for adapting the beam diameter 2 $\omega_{FLMLx}$ of a respective coherent laser beam 3.1, . . . , 3.5, for which the following should apply: $2\ \omega_{FLMLx}=\lambda_L\ f_{ML}/p_x$, provided this condition is not satisfied by the emission surfaces at the fiber ends.

The intensity of the coherent laser beams 3.1, . . . , 3.5 can be chosen to be identical, as is typically the case in the beam shaping device 10 described in FIG. 2*a*. However, the maximum intensities of the coherent laser beams 3.1, . . . , 3.5 in the case of the beam shaping device 10 shown in FIG. 2*b* having a respective maximum intensity at the grid positions 8.1, . . . , 8.5, the envelope of said maximum intensity corresponding to an intensity distribution I of the combined laser beam 12 at or immediately downstream of the microlens array 17, as depicted in FIG. 3, is also possible or advantageous. Like in the case of the intensity distributions of the coherent laser beams 3.1, . . . , 3.5 in the example shown, the intensity distribution I of the combined laser beam 12 at the microlens array 17 is a Gaussian distribution.

As was described further above, the following applies to the beam diameter 2 $\omega_{FLAx}$ of the combined laser beam 12 at the microlens array 17: $2\ \omega_{FLAx}=4\ p_x/(\pi FF_x)$. The beam diameter 2 $\omega_{FLAx}$ of the combined laser beam 12, and hence the combination efficiency, therefore reduces with increasing fill factor $FF_x$. In the case of the beam shaping device 10 shown in FIG. 2*b*, the following should apply to the fill factor $FF_x$ in the first direction X: $FF_x<0.4$, preferably $FF_x<0.3$. In principle, what applies is that the fill factor $FF_x$ should be smaller, the greater the number N of combined coherent laser beams 3.1, . . . , 3.5. In the case where the coherent laser beams are additionally combined in a second direction Y (see below), the following should apply to the fill factor $FF_y$ in the second direction Y: $FF_y<0.4$, preferably $FF_y<0.3$.

In order to form a combined laser beam 12 with a corresponding Gaussian profile with a larger beam diameter 2 $\omega_{FLAx}$, which is diffracted into the zeroth order of diffraction $B_{0,x}$ or into a higher order of diffraction $B_{k,x}$, from the laser beams 3.1, . . . , 3.5 with the beam diameter 2 $\omega_{FLMLx}$ in the microlens arrangement 11, it is necessary in the case of the two beam shaping devices 10 of FIG. 2*a,b* for the laser beams 3.1, . . . , 3.5 to be radiated on the microlens array 17 with a phase front or with individual fundamental phases $\delta\varphi_a$ (that depend on the angle of incidence θ) as specified below:

$$\delta\varphi_a=-\pi/N(m_a+B_{k,x})^2,$$

where the following applies:

$$m_a=-\frac{(N+1)}{2}+a$$

with a=1, . . . , N, where N is the number of the grid positions arranged in the first direction (in this case: N=5) and where $B_{k,x}$ is an integer or half integer, for which the following applies:

$$-\frac{(N+1)}{2}\leq B_{k,x}\leq+\frac{(N+1)}{2}.$$

In the case where the number N of coherent laser beams is odd, the order of diffraction $B_{k,x}$ assumes integer values. In the case where the number N of coherent laser beams is even, the order of diffraction $B_{k,x}$ assumes half integer values.

The fundamental phase $\delta\varphi_a$ differs for each individual coherent laser beam 3.1, . . . , 3.5 and is therefore set with the aid of the phase setting devices 6.1, . . . , 6.N and not with the aid of one or more optical elements of the input coupling optical unit 18, even if this would also be possible as a matter of principle.

With the aid of the condition, specified above, for the fundamental phases $\delta\varphi_a$, the combined laser beam 12 can be diffracted into the zeroth order of diffraction $B_{0,x}$ in a targeted manner, in the case of which the laser beam 12 propagates in the Z-direction as represented in FIG. 2*a,b*. By defining $B_{k,x}$ as an odd or even non-zero number, the combined laser beam 12 can be diffracted into the corresponding order of diffraction $B_{k,x}$ (in the X-direction) that differs from the zeroth order of diffraction, in the case of which corresponding order of diffraction the laser beam 12 propagates at an angle to the Z-direction.

In the example shown in FIG. 2*a,b*, a further Fourier lens 21 arranged in the beam path downstream of the microlens array 17 at a distance of its object-side focal length $f_{FLout}$ assists in imaging the combined laser beam 12 diffracted into the zeroth or a higher order of diffraction $B_{k,x}$ into a further grid arrangement 16' in an image-side focal plane of the further Fourier lens 21. The following applies to the distances δx' between the further grid positions 8.1', . . . , 8.5' of the further grid arrangement 16': $\delta x'=\delta x\ f_{FLout}/f_{FLin}$. Accordingly, the following applies, in the focal plane of the further Fourier lens 21, to the beam diameter $2\ \omega_{FLx}'$ of the combined laser beam 12 that has been diffracted into the respective order of diffraction $B_{k,x}$: $2\ \omega_{FLMLx}'=2\ \omega_{FLMLx}\ f_{FLout}/f_{FLin}$. The combined laser beam 12 that has been diffracted into the $B_{k,x}$-th order of diffraction is imaged on the $B_a$-th further grid position 8.1', . . . , 8.N', with the following applying:

$$B_{k,x} = -\frac{(N+1)}{2} + B_a,$$

where $B_a$=1, . . . , N.

For the case of four coherent laser beams 3.1, . . . , 3.4 (N=4), represented in exemplary fashion in FIG. 4*a*, the following applies to the four orders of diffraction $B_{k,x}$ into which the combined laser beam 12 can be diffracted: $B_{-1.5,x}=-1.5$, $B_{-0.5,x}=-0.5$, $B_{+0.5,x}=+0.5$ and $B_{+1.5,x}=+1.5$. In the case where the combined laser beam 12 is diffracted into the +0.5-th order of diffraction $B_{+0.5,x}$, the following applies to the four fundamental phases to be set $\delta\varphi_1, \ldots, \delta\varphi_4$:

$$\delta\varphi_1=-(\pi/4)(-1.5+0.5)^2=-\pi/4$$

$$\delta\varphi_2=-(\pi/4)(-0.5+0.5)^2=0$$

$$\delta\varphi_3=-(\pi/4)(0.5+0.5)^2=-\pi/4$$

$$\delta\varphi_4=-(\pi/4)(1.5+0.5)^2=-\pi$$

Below, an assumption is made that, in the case of the apparatuses 5 shown in FIGS. 1*a-c* or in the case of the further apparatus 5', the fundamental phases $\delta\varphi_a$ of the laser beams 3.1, . . . , 3.N or of the further laser beams 3.1', . . . , 3.N' are set in accordance with the condition specified above (with k=0) in order to diffract the combined laser beam 12 or the further combined laser beam 12' into the zeroth order of diffraction $B_{0,x}$.

To diffract the laser beam 12 into an order of diffraction $B_{k,x}$ in the X-direction that differs from the zeroth order of diffraction, it is advantageous proceeding from the fundamental phase $\delta\varphi_a$ set in this way to set a respective additional phase $\Delta\varphi_a$ of a coherent laser beam 3.1, . . . , 3.N at an a-th grid position 8.1, . . . , 8.N (a=1, . . . , N), which additional phase is given by:

$$\Delta\varphi_a=-(2\pi/N)(a-(N+1)/2)B_{k,x}.$$

In this case N denotes, like further above, the number of the grid positions 8.1, . . . , 8.N that is arranged on a common line in the X-direction in a one-dimensional grid arrangement 16, and $B_{k,x}$ denotes an integer or half integer, for which the following applies:

$$-\frac{(N+1)}{2} \le B_{k,x} \le +\frac{(N+1)}{2}.$$

For the coherent superposition into the zeroth order of diffraction $B_{0,x}$, the respective additional phase $\Delta\varphi_a$ is added to the fundamental phase $\delta\varphi_a$ specified above. In particular for the scanning process described further below, within the scope of which the order of diffraction $B_{k,x}$ is changed, it was found to be advantageous proceeding from the fundamental phase $\delta\varphi_a$ for the diffraction into the zeroth order of diffraction $B_{0,x}$ to use the additional phase $\Delta\varphi_a$ for the diffraction into (at least) one higher order of diffraction $B_{k,x}$ and not to set the fundamental phase $\delta\varphi_a$ accordingly, i.e., for the diffraction into a higher order of diffraction $B_{k,x}$.

For the case of five coherent laser beams 3.1, . . . , 3.5, described in exemplary fashion in FIG. 2*a,b*, the following applies to the orders of diffraction $B_{k,x}$ that differ from the zeroth order of diffraction $B_{0,x}$ and into which the laser beam 12 can be diffracted: $B_{-2,x}=-2$, $B_{-1,x}=-1$, $B_{+1,x}=+1$ and $B_{+2,x}=+2$. In FIG. 4*b*, a respective individual additional phase $\Delta\varphi_1, \ldots, \Delta\varphi_5$ is specified for the five laser beams 3.1, . . . , 3.5, which brings about the diffraction of the combined laser beam 12 into the −1st order of diffraction $B_{-1,x}$. The associated far field (angle distribution) produced by means of the beam combining device 10 is represented in FIG. 5*a*.

To set the (individual) additional phases $\Delta\varphi_a$ of the laser beams 3.1, . . . , 3.5, the phase setting devices 8.1, . . . , 8.5 are controlled with the aid of the control device 15 such that these produce the respective correct additional phase $\Delta\varphi_a$ for the a-th coherent laser beam 3.1, . . . , 3.N.

In the example shown in FIG. 4*b*, that is to say in the case of a number of N=5 laser beams 3.1, . . . , 3.5 and a laser beam 12 that is diffracted into the −1st order of diffraction $B_{-1,x}$ in the X-direction, the following applies to the five additional phases $\Delta\varphi_1, \ldots, \Delta\varphi_5$ to be set:

$$\Delta\varphi_1=-(2\pi/5)(-2)(-1)=-4/5\pi$$

$$\Delta\varphi_2=-(2\pi/5)(-1)(-1)=-2/5\ \pi$$

$$\Delta\varphi_3=0$$

$$\Delta\varphi_4=-(2\pi/5)(-1)(-1)=+2/5\ \pi$$

$$\Delta\varphi_5=-(2\pi/5)(2)(-1)=+4/5\ \pi$$

To realize a discrete scanning process, in which the combined laser beam 12 is switched back and forth between different orders of diffraction $B_{k,x}$, the control device 15 can vary the respective additional phase $\Delta\varphi_a$ of the coherent laser beams 3.1, . . . , 3.N by virtue of acting on the (quickly switchable) phase setting devices 6.1, . . . , 6.N. By way of example, the laser beam 12 can be moved from the −1st order of diffraction $B_{-1,x}$ in the X-direction to the +2nd order of diffraction $B_{+2,x}$ in the X-direction by virtue of the additional phases $\Delta\varphi_1, \ldots, \Delta\varphi_5$ shown in FIG. 3*b* being set in place of the additional phases $\Delta\varphi_1, \ldots, \Delta\varphi_5$ shown in FIG. 3*a*.

If the far field shown in FIG. 5*a* is imaged by means of an imaging optical unit, for example the further Fourier lens 21 shown in FIG. 2*a,b*, the angle distribution is converted into a spatial distribution. In this way, it is possible to produce an adjustable beam offset of the combined laser beam 12, that is to say the laser beam 12 can be offset by a desired distance in the X-direction, which depends on the order of diffraction $B_{k,x}$, from the optical axis that runs in the Z-direction in the center of the beam combining device 10. In this case, the combined laser beam 12 can be focused in particular at a (varying) focal position in a focal plane, as shown in exemplary fashion in FIG. 2*a,b* for the focal plane of the further Fourier lens 21.

FIG. 5*b* shows the far field of the beam combining device 10, in which the five coherent laser beams 3.1, . . . , 3.5 are combined to form a first laser beam 12*a* that is diffracted into a first order of diffraction $B_{-1,x,1}$ and a second laser beam 12*b* that is diffracted into a second order of diffraction $B_{0,x,2}$. To this end, the additional phases $\Delta\varphi_1, \ldots, \Delta\varphi_5$ of the coherent laser beams 3.1, . . . , 3.5 are likewise suitably set. To set the additional (absolute) phases $\Delta\varphi_1, \ldots, \Delta\varphi_5$, it is possible to apply an iterative optimization algorithm which runs in the control device 15 or which was already implemented in advance. As a rule, the phases that are suitable for a certain processing process, for example a laser cutting process, a laser welding process, a laser marking process, additive manufacturing, etc., are stored in the form of data sets or tables in the control device 15 itself or in an electronic memory connected to the latter, or such phases are specified by an operator.

In the example shown in FIG. 5*b*, the additional phases $\Delta\varphi_1, \ldots, \Delta\varphi_5$ are chosen such that a first laser beam 12*a* is diffracted into the −1st order of diffraction $B_{-1,x,1}$, like in FIG. 5*a*, and, additionally, a second laser beam 12*b* is diffracted into the zeroth order of diffraction $B_0$.

In the examples shown, the intensity or the power of the first and second laser beam 12*a*, 12*b* can be of equal magnitude, that is to say the power produced by the seed laser source is divided equally among the two laser beams 12*a,b*. If the condition specified above for the additional phase $\Delta\varphi_a$ is observed, the input power p, which is input coupled into the beam combining device 10, is divided equally (50:50) in FIG. 5*b* among the laser beam 12*b* diffracted into the 0th order of diffraction and the laser beam 12*a* diffracted into the −1st order of diffraction, that is to say the following applies: $p_{-1}=p_0=p/2$.

However, it is also possible to set the proportion of the input power p that is diffracted into the respective order of diffraction $B_{k,x,1}$, $B_{k,x,2}$ to deviate from an equal distribution in a targeted manner. In the example shown in FIG. 5*b*, a proportion of 80% of the input power p can be diffracted for example into the −1st order of diffraction and a proportion of 20% of the input power p can be diffracted into the 0th order of diffraction, that is to say, the following applies: $p_{-1}=0.8$ p, $p_0=0.2$ p. In general, the split of the input power p among the 0th and the ±1st order of diffraction can for example be implemented as follows: $p_0=C$ p; $p_{\pm1}=(1-C)$ p, where $0<C<1$.

For the additional phase $\Delta\varphi_a$ of a respective coherent laser beam 3.1, . . . , 3.N at an a-th grid position 8.1, . . . , 8.N in the X-direction, which produces the aforementioned power distribution with the factor C, the following applies:

$$\Delta\varphi_a=C(2\pi/N)(a-(N+1)/2).$$

The distribution factor C can be chosen to be constant or can be varied in a time dependent manner by the control device 15. In the latter case, the apparatus 5 can be operated in the style of an (acousto-optic or electro-optic) modulator or deflector.

In the case of a number M of more than two combined laser beams 12*a*, 12*b*, . . . , the split can for example be realized in the form of a (e.g. linear) power ramp, in the case of which a first combined laser beam is diffracted with a maximum power $p_{k,max}$ into the k-th order of diffraction and the remaining M−1 combined laser beams are diffracted into the remaining M−1 orders of diffraction with a power that has been reduced in relation to the maximum power $p_{k,max}$. By way of example, for the power distribution in the form of a power wedge, the following may apply: a/M $p_{k,max}$, where a=1, . . . , M. For the example of a total of 5 diffracted combined laser beams, proportions of the maximum power $p_{k,max}$ of 100%, 80%, 60%, 40% and 20% arise.

What applies in principle is that, by way of a suitable choice of the additional phases $\Delta\varphi_1, \ldots, \Delta\varphi_5$, the coherent laser beams 3.1, . . . , 3.5 can be combined into two or more than two laser beams 12*a*, 12*b*, . . . which—with an equally distributed power or different power—are diffracted into corresponding orders of diffraction $B_{k,x,1}$, $B_{k,x,2}$, . . . .

Figure 6A:
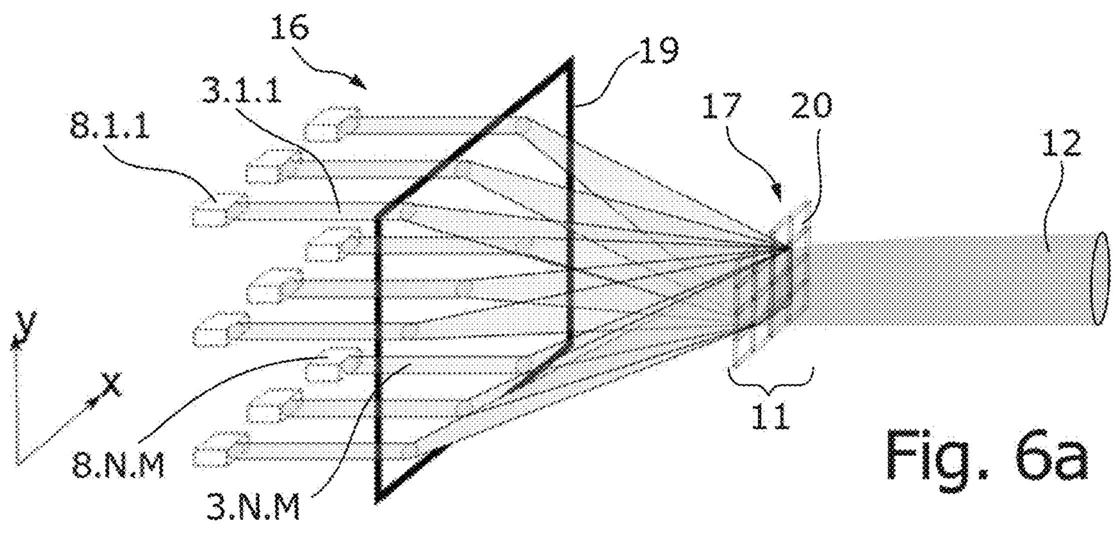
FIGS. 6*a*, 6*b*, and 6*c* show representations of three beam combining devices, wherein grid positions of the coherent laser beams are arranged in a two-dimensional grid arrangement in each case.
Figure 6B:
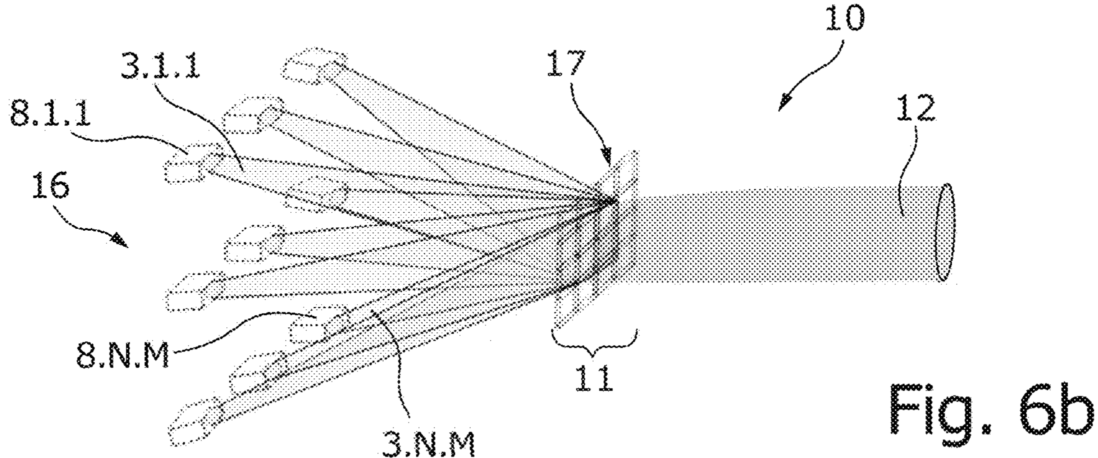
Figure 6C:
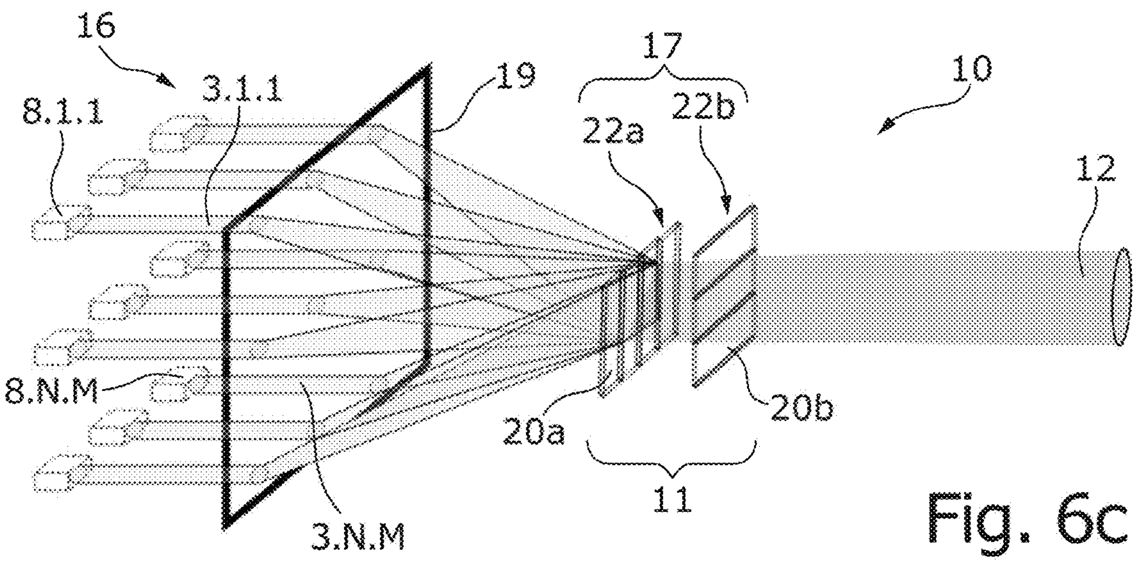

In the laser system 1 described in the context of FIGS. 1*a-c* to FIG. 5*a,b*, the laser beams 3.1, . . . , 3.N were combined one-dimensionally. FIGS. 6*a-c* each show an optical arrangement in which a number N (in this case: N=3)×M (in this case: M=3) of grid positions 8.1.1, . . . , 8.N.M are arranged in a two-dimensional grid arrangement 16. In the example shown in FIG. 6*a*, the grid positions 8.1.1, . . . 8.N.M are arranged in a rectangular grid arrangement 16 in a common plane (XY-plane) and the beam propagation directions of all laser beams 3.1.1, . . . , 3.N.M run parallel (in the Z-direction). In a manner analogous to FIG. 2*a*, the input coupling optical unit 18 in the optical arrangement of FIG. 6*a* has only one focusing device in the form of a focusing lens 19, which is represented by a square in FIG. 6*a*. The microlenses 20 of the microlens array 17 of the microlens arrangement 11 are arranged in a corresponding, rectangular grid arrangement and are aligned parallel to the XY-plane. The microlenses 20 are square lenses, which act like cylindrical lenses in both directions X, Y.

In the optical arrangement shown in FIG. 6*b*, the grid positions 8.1.1, . . . , 8.N.M are likewise arranged in a grid arrangement 16 or in an array, the latter however extending along a curved surface, more precisely along a spherical shell, with the beam propagation directions of the laser beams 3.1.1, . . . , 3.N.M being aligned perpendicular to the spherical shell and the microlens arrangement 11 being arranged in the vicinity of the center of the spherical shell. An arrangement of the grid positions 8.1.1, . . . , 8.N.M in a grid arrangement 16 extending along a different curved surface, for example along an ellipsoid, is also possible. It is possible to dispense with an input coupling optical unit 18 in this case.

FIG. 6*c* shows an optical arrangement analogous to FIG. 6*a*, in which the two-dimensional microlens array 17 of the microlens arrangement 11 is replaced by two one-dimensional partial microlens arrays 22*a*, 22*b*. The partial microlens arrays 22*a*, 22*b* each have a plurality of microlenses 20*a,b* in the form of cylindrical lenses, with the microlenses 20*a* of the first partial microlens array 22*a* and the microlenses 20*b* of the second partial microlens array 22*b* being aligned perpendicular to one another, specifically in the X-direction and Y-direction, respectively. Unlike what is represented in FIG. 6*c*, the two one-dimensional partial microlens arrays 22$a,b$ can be arranged immediately adjoining one another in a common plane, and correspond to the case represented in FIG. 6$a$.

It is understood that the two-dimensional combination of the coherent laser beams 8.1.1, . . . , 8.N.M is also possible analogously in the beam combining device 10 represented in FIG. 2$b$, with the Fourier lens 19 being able to be dispensed with in this case and the rectangular or square grid arrangement 16 being arranged at the distance of the focal length $f_{ML}$ upstream of the microlens array 17 and the coherent laser beams 3.1.1, . . . , 3.N.M being radiated with parallel alignment to one another on the microlens array 17.

Depending on the spacings of the grid positions 8.1.1, . . . 8.N.M or the periodicity of the grid arrangement 16 in the X-direction and/or Y-direction, it is also possible for the pitches $p_x$, $p_Y$ of the microlenses 20$a,b$ to differ from one another in the two mutually perpendicular directions X, Y. Accordingly, the microlenses 20 of FIG. 6$a$ have an optionally different curvature in the X-direction and in the Y-direction, that is to say these are not cylindrical lenses. The combination of the coherent laser beams 3.1.1, . . . 3.N.M in the two linearly independent directions X, Y, which are perpendicular in the example shown, is independent as a matter of principle, that is to say the conditions or equations specified further above apply to both directions X, Y independently of one another.

Only when setting the phase of the laser beams 3.1.1, . . . 3.N.M do the contributions in the two mutually perpendicular directions add, that is to say the following applies in relation to the respective additional phase for a number of N×M laser beams 3.1.1, . . . 3.N.M arranged in a rectangular grid arrangement 16 (in X-direction and Y-direction):

$$\Delta\varphi_{a,b}=-((2\pi/N)(a-(N+1)/2)B_{k,x}+(2\pi/M)(b-(M+1)/2)B_{j,y}) \tag{3}$$

where M denotes a number of the grid positions in the second direction Y and $B_{j,y}$ denotes an integer or half integer, for which the following applies:

$$-\frac{(M+1)}{2} \le B_{j,y} \le +\frac{(M+1)}{2}.$$

Accordingly, the contributions of the fundamental phases $\delta\varphi_{a,b}$ also add in the two mutually perpendicular directions X, Y, that is to say the following applies:

$$\delta\varphi_a=-\pi/N(m_a+B_{k,x})^2-\pi/N(m_b+B_{j,y})^2, \tag{4}$$

where the following applies:

$$m_b = -\frac{(M+1)}{2} + b$$

with b=1, . . . , M, where M is a number of the grid positions arranged in the second direction and where $B_{j,y}$ is an integer or half integer, for which the following applies:

$$-\frac{(M+1)}{2} \le B_{j,y} \le +\frac{(M+1)}{2}.$$

Figures 7, 8, 9:
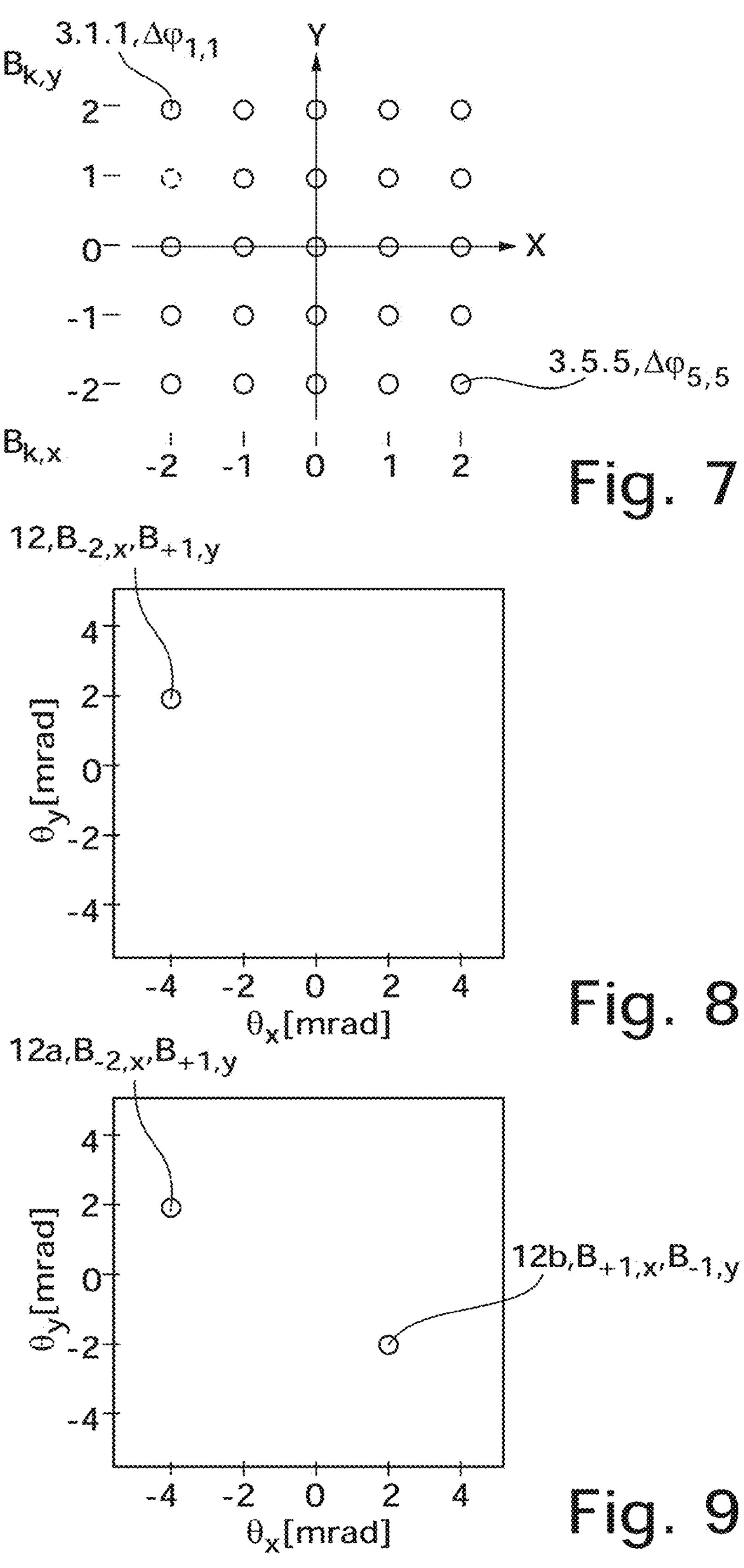
FIG. 7 shows a representation of a two-dimensional arrangement of 5×5 coherent laser beams with a respective assigned additional phase for producing a single diffracted laser beam or multiple diffracted laser beams.
FIG. 8 shows a representation of the far field of the beam combining device, wherein the phases are chosen such that the combined laser beam is diffracted into exactly one order of diffraction.
FIG. 9 shows a representation of the far field of the beam combining device, wherein the phases are chosen such that two combined laser beams are diffracted into two different orders of diffraction.

FIG. 7 shows, in a manner analogous to FIG. 4$b$, a two-dimensional arrangement of N=5×M=5 coherent laser beams 3.1.1, . . . , 3.5.5 with a respectively assigned additional phase $\Delta\varphi_{a,b}$(a=1, . . . , N; b=1, . . . , M) for producing a single laser beam 12 that is diffracted into an order of diffraction $B_{-2,x}$ in the X-direction and into an order of diffraction $B_{+1,Y}$ in the Y-direction (cf. FIG. 8) or for producing a first laser beam 12$a$ diffracted into a first order of diffraction $B_{-2,x,1}$ (in the X-direction), $B_{+1,y,1}$ (in the Y-direction) and a second laser beam 12$b$ diffracted into a second order of diffraction $B_{+1,x,2}$ (in the X-direction), $B_{-1,y,2}$ (in the Y-direction) (FIG. 9).

To produce a single laser beam 12 that is diffracted into a (two-dimensional) order of diffraction $B_{k,x}$, $B_{k,y}$, an additional phase $\Delta\varphi_{a,b}$ given by equation (3) above is set for an (a,b)-th grid position 8.$a.b$ in the two-dimensional grid arrangement 16 (cf. FIG. 6$a$), that is to say for an a-th grid position in the X-direction that simultaneously forms a b-th grid position in the Y-direction, or for an (a,b)-th coherent laser beam 3.$a.b$ (cf. FIG. 7).

Accordingly, the respective additional phases $\Delta\varphi_{a,b}$ are also set with the aid of an iterative, stochastic optimization algorithm in the far field represented in FIG. 9 in order to produce the first laser beam 12$a$ that is diffracted into a first order of diffraction $B_{-2,x,1}$ (X-direction), $B_{+1,y,1}$ (Y-direction) and the second laser beam 12$b$ that is diffracted into the second order of diffraction $B_{+1,x,2}$ (X-direction), $B_{-1,y,2}$ (Y-direction).

As was described further above, the number and the arrangement of the laser beams 12$a$, 12$b$, . . . that are diffracted into the orders of diffraction $B_{k,x,1}$, $B_{k,y,1}$; $B_{k,x,2}$, $B_{k,y,2}$, . . . are as desired as a matter of principle and are only restricted by the number N and/or M of the coherent laser beams 3.$a.b$ used for the combination. By way of a suitable choice or variation of the additional phases $\Delta\varphi_a$ in a one-dimensional grid arrangement 16 or of the additional phases $\Delta\varphi_{a,b}$ in a two-dimensional grid arrangement 16, it is possible, in a targeted manner, to activate or deactivate individual combined laser beams, groups of combined laser beams or an entire array of combined laser beams, which corresponds to a set of orders of diffraction.

Using the above-described laser system 1, it is therefore possible to obtain a (discrete) one-dimensional or two-dimensional scanning process or a targeted beam deflection and/or a targeted split of the combined laser beam 12 among two or more laser beams 12$a$, 12$b$. The combined laser beam(s) 12, 12$a,b$ can be imaged or focused on (a) (varying) focal position(s) in a focal plane with the aid of an additional optical unit, for example the Fourier lens 19 represented in FIG. 2$a,b$.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An apparatus for combining a plurality of coherent laser beams, comprising:

a splitting device for splitting an input laser beam into the plurality of coherent laser beams, a plurality of phase setting devices each for adjusting a respective phase of one of the coherent laser beams, and a beam combining device for combining the coherent laser beams, which emanate from a plurality of grid positions of a grid arrangement, to form at least one combined laser beam, wherein the beam combining device has a microlens arrangement with exactly one microlens array, and the exactly one microlens array emits the at least one combined laser beam; and wherein the plurality of grid positions are arranged in a first direction at a distance of a focal length $f_{ML}$ of the microlens array upstream of the microlens array and having a distance $\delta_X$ from one another, which is given by $$\delta_x = p_{xj}$$

where $p_x$ denotes a pitch of microlenses of the microlens array in the first direction.

2. The apparatus as claimed in claim 1, wherein the plurality of grid positions are arranged in the first direction, with the coherent laser beams and the microlens array satisfying the following condition:

$$N = p_x^2 / (\lambda_L f_{ML}),$$

where N denotes a number of the plurality of grid positions arranged in the first direction, $p_x$ denotes the pitch of the microlenses of the microlens array in the first direction, $\lambda_L$ denotes a laser wavelength of the input laser beam, and $f_{ML}$ denotes the focal length of the microlens array.

3. The apparatus as claimed in claim 1, wherein the apparatus is configured to couple the coherent laser beams that are adjacent in the first direction into the microlens arrangement with a specified angle difference $\delta\theta_x$, for which the following applies:

$$\delta\theta_x = \lambda_L / p_x,$$

where $\lambda_L$ denotes a laser wavelength of the input laser beam and $p_x$ denotes the pitch of the microlenses of the microlens array in the first direction.

4. The apparatus as claimed in claim 1, wherein the coherent laser beams have a fill factor $FF_x$ in the first direction, the following applying to the fill factor:

$$FF_x < 0.4.$$

5. The apparatus as claimed in claim 1, further comprising:

a control device configured to adjust a respective phase of one of the coherent laser beams on the basis of an arrangement of the respective grid position within the grid arrangement in order to combine the coherent laser beams to form at least one laser beam that is diffracted into at least one order of diffraction.

6. The apparatus as claimed in claim 5, wherein the control device is configured to adjust a respective fundamental phase of one of the coherent laser beams, in the case of which fundamental phase the beam combining device combines the coherent laser beams to form one laser beam that is diffracted into exactly one order of diffraction.

7. The apparatus as claimed in claim 6, wherein the grid positions are arranged in a first direction and wherein the control device is configured, for the purposes of combining the coherent laser beams to form the exactly one combined laser beam that is diffracted into the exactly one order of diffraction $B_{k,x}$ in the first direction, to set the respective fundamental phase $\delta\omega_a$ of a coherent laser beam at an $a^{th}$ grid position in the first direction which is given by:

$$\delta\omega_a = -\pi/N(m_a + B_{k,x})^2$$

where the following applies:

$$m_a = -\frac{(N+1)}{2} + a$$

with a=1, . . . , N, where N denotes a number of the grid positions arranged in the first direction and where $B_{k,x}$ is an integer or half integer, for which the following applies:

$$-\frac{(N+1)}{2} \leq B_{k,x} \leq +\frac{(N+1)}{2}.$$

8. The apparatus as claimed in claim 7, wherein the grid positions in the grid arrangement are additionally arranged in a second direction perpendicular to the first direction and wherein the control device is configured, for the purposes of combining the coherent laser beams to form the exactly one combined laser beam that is diffracted into the exactly one order of diffraction $B_{k,x}$ in the first direction and into exactly one order of diffraction $B_{j,y}$ in the second direction, to set the respective fundamental phase $\delta\varphi_{a,b}$ of a coherent laser beam at an $a^{th}$ grid position in the first direction and at a $b^{th}$ grid position in the second direction which is given by:

$$\delta\varphi_a = -\pi/N(m_a + B_{k,x})_2 - \pi/N(m_b + B_{j,y})^2$$

where the following applies:

$$m_b = -\frac{(M+1)}{2} + b$$

with b=1, . . . , M, where M is a number of the grid positions arranged in the second direction and where $B_{j,y}$ is an integer or half integer, for which the following applies:

$$-\frac{(M+1)}{2} \leq B_{j,y} \leq +\frac{(M+1)}{2}.$$

9. The apparatus as claimed in claim 7, wherein the splitting device is configured as a further microlens arrangement with at least two further microlens arrays, and wherein the control device is configured, for the purposes of combining the coherent laser beams to form the exactly one combined laser beam that is diffracted into the exactly one order of diffraction $B_{k,x}$ in the first direction and preferably diffracted into the exactly one order of diffraction $B_{j,y}$ in the second direction, to set twice as much of the fundamental phases.

10. The apparatus as claimed in claim 7, wherein the control device is configured to set the respective phase of one of the coherent laser beams that is composed of the respective fundamental phase and an additional phase.

11. The apparatus as claimed in claim 10, wherein the grid positions are arranged in a first direction and wherein the control device is configured, for the purposes of combining the coherent laser beams to form a single combined laser beam that is diffracted into an order of diffraction $B_{k,x}$ in the first direction that differs from the zeroth order of diffraction, to set the respective additional phase $\Delta\varphi_a$ of a coherent laser beam at an $a^{th}$ grid position in the first direction which is given by:

$$\Delta\varphi_a=-(2\pi/N)(a-(N+1)/2)B_{k,x},$$

where N denotes a number of the grid positions arranged in the first direction and $B_{k,x}$ denotes an integer or half integer, for which the following applies:

$$-\frac{(N+1)}{2} \le B_{k,x} \le +\frac{(N+1)}{2}.$$

12. The apparatus as claimed in claim 11, wherein the grid positions in the grid arrangement are additionally arranged in a second direction that is perpendicular to the first direction and wherein the control device is configured, for the purposes of combining the coherent laser beams to form a single combined laser beam that is diffracted into the order of diffraction $B_{k,x}$ in the first direction that differs from the zeroth order of diffraction and into an order of diffraction $B_{k,y}$ in the second direction that differs from the zeroth order of diffraction, to set an additional phase $\Delta\varphi_{a,b}$ of a coherent laser beam at an $a^{th}$ grid position in the first direction and at a $b^{th}$ grid position in the second direction which is given by:

$$\Delta\varphi_{a,b}=-((2\pi/N)(a-(N+1)/2)B_{k,x}+(2\pi/M)(b-(M+1)/2)B_{k,y}),$$

where M denotes a number of the grid positions in the second direction and $B_{j,y}$ denotes an integer or half integer, for which the following applies:

$$-\frac{(M+1)}{2} \le B_{j,y} \le +\frac{(M+1)}{2}.$$

13. The apparatus as claimed in claim 6, wherein the control device is configured to vary the respective phase of one of the coherent laser beams on the basis of an arrangement of the respective grid position within the grid arrangement in order to change an order of diffraction into which the at least one combined laser beam is diffracted.

14. The apparatus as claimed in claim 13, wherein the control device is configured to vary the respective additional phase of the coherent laser beams for the purposes of changing a first order of diffraction, into which a first combined laser beam is diffracted, and/or for the purposes of changing a second order of diffraction, into which a second combined laser beam is diffracted.

15. The apparatus as claimed in claim 13, wherein the control device is configured to adjust a respective additional phase of the coherent laser beams for the purposes of producing a specified, in particular different power of at least two combined laser beams that are diffracted into different orders of diffraction.

16. The apparatus as recited in claim 1, further comprising:

a seed laser source configured to produce a seed laser beam, and direct the seed laser beam as the input laser beam of the splitting device.

17. A method for combining a plurality of coherent laser beams, in particular by means of an apparatus as claimed in claim 1, comprising:

input coupling the plurality of coherent laser beams emanating from a plurality of grid positions arranged in a grid arrangement into a microlens arrangement having exactly one microlens array, and combining the coherent laser beams in the microlens arrangement to form at least one combined laser beam.

18. The method as claimed in claim 17, further comprising:

adjusting a respective phase of one of the coherent laser beams on the basis of an arrangement of the respective grid position within the grid arrangement in order to combine the coherent laser beams to form the at least one laser beam that is diffracted into at least one order of diffraction.

19. The method as claimed in claim 18, further comprising:

varying a respective additional phase of the coherent laser beams for the purposes of changing a first order of diffraction, into which a first combined laser beam is diffracted, and/or for the purposes of changing a second order of diffraction, into which a second combined laser beam is diffracted, proceeding from a respective fundamental phase in the case of which the beam combining device combines the coherent laser beams to form exactly one laser beam that is diffracted into exactly one order of diffraction.

20. The method as claimed in claim 18, further comprising:

adjusting a respective additional phase of the coherent laser beams for the purposes of producing a specified, in particular different power of at least two combined laser beams that are diffracted into different orders of diffraction proceeding from a respective fundamental phase, in the case of which the beam combining device combines the coherent laser beams to form exactly one laser beam that is diffracted into exactly one order of diffraction.

21. An apparatus for combining a plurality of coherent laser beams, comprising:

a splitting device for splitting an input laser beam into the plurality of coherent laser beams, a plurality of phase setting devices each for adjusting a respective phase of one of the coherent laser beams, and a beam combining device for combining the coherent laser beams, which emanate from a plurality of grid positions of a grid arrangement, to form at least one combined laser beam, wherein the beam combining device has a microlens arrangement with exactly one microlens array for forming the at least one combined laser beam, wherein the plurality of grid positions are arranged in a first direction at a distance of a focal length $f_{ML}$ of the microlens array upstream of the microlens array and having a distance $\delta_x$ from one another, which is given by $$\delta_x = P_x$$

where $p_x$ denotes a pitch of microlenses of the microlens array in the first direction; and wherein the coherent laser beams have at the grid positions a beam diameter $2\omega_{FML_x}$, which is given by:

$$2\omega_{fML_x} = \lambda_L f_{ML} / P_x,$$

where $\lambda_L$ denotes a laser wavelength of the input laser beam.

22. An apparatus for combining a plurality of coherent laser beams, comprising:

a splitting device for splitting an input laser beam into the plurality of coherent laser beams, a plurality of phase setting devices each for adjusting a respective phase of one of the coherent laser beams, a beam combining device for combining the coherent laser beams, which emanate from a plurality of grid positions of a grid arrangement, to form at least one combined laser beam, a seed laser source configured to produce a seed laser beam, and direct the seed laser bean as the input laser beam of the splitting device, and a further apparatus for combining a plurality of further coherent laser beams, comprising:

a further splitting device for splitting the seed laser beam into the plurality of further coherent laser beams, a plurality of further phase setting devices for adjusting a respective phase of one of the further coherent laser beams, and a further beam combining device for combining the further coherent laser beams emanating from a plurality of further grid positions of a further grid arrangement, with the further beam combining device comprising a further microlens arrangement having at least one further microlens array, and a further control device which is configured to adjust the respective phase of one of the further coherent laser beams on the basis of an arrangement of the respective further grid position within the further grid arrangement in order to combine the coherent further laser beams to form a laser beam that is diffracted into exactly one order of diffraction, the diffracted laser beam forming the input laser beam of the splitting device of the apparatus, wherein the beam combining device has a microlens arrangement with exactly one microlens array for forming the at least one combined laser beam.

* * * * *